United States Patent [19]
Rawlings et al.

[11] Patent Number: 5,335,625
[45] Date of Patent: Aug. 9, 1994

[54] PORTABLE PROGRAMMABLE LIQUID FEED DISPENSING DEVICE

[76] Inventors: Richard T. Rawlings, 4218 Sunny Ridge Rd., Nampa, Id. 83686; Kirk Bowman, 8899 E. Missouri, Nampa, Id. 83683; Bradley R. Holton, P.O. Box 176, Greenleaf, Id. 83626

[21] Appl. No.: 55,811

[22] Filed: Apr. 29, 1993

[51] Int. Cl.$^5$ ............................................. A01K 7/02
[52] U.S. Cl. ............................................. 119/74; 119/77
[58] Field of Search ................ 119/51.03, 51.11, 51.5, 119/71, 74, 77

[56] References Cited

U.S. PATENT DOCUMENTS

| | | | |
|---|---|---|---|
| 2,782,760 | 2/1957 | Wolfe | 119/51.5 |
| 2,844,124 | 7/1958 | Andera | 119/75 |
| 3,192,902 | 7/1965 | Gammill | 119/51.11 |
| 3,195,512 | 7/1965 | Jackson | 119/78 |
| 3,208,431 | 9/1965 | Kloss | 119/51.11 |
| 3,234,910 | 2/1966 | Moloney | 119/51.11 |
| 3,265,036 | 8/1966 | Kloss | 119/51 |
| 3,295,500 | 1/1967 | Blough | 119/51.5 |
| 3,347,212 | 10/1967 | Anderson et al. | 119/51.11 |
| 3,441,004 | 4/1969 | Henke et al. | 119/72 |
| 3,561,403 | 2/1971 | Wilson, Jr. et al. | 119/51.11 |
| 3,720,135 | 3/1973 | Aldous et al. | 119/51.11 |
| 4,055,147 | 10/1977 | Fletcher et al. | 119/72.5 |
| 4,181,097 | 1/1980 | Betsuno | 119/51.11 |
| 4,337,728 | 7/1982 | Van Gilst et al. | 119/51.5 X |

FOREIGN PATENT DOCUMENTS

| | | | |
|---|---|---|---|
| 1404041 | 6/1988 | U.S.S.R. | 119/75 |
| 1556606 | 4/1990 | U.S.S.R. | 119/74 |

*Primary Examiner*—Robert P. Swiatek
*Attorney, Agent, or Firm*—Frank J. Dykas; Craig M. Korfanta

[57] ABSTRACT

An apparatus for dispensing a liquid feed supplement to animals in measured quantity according to an established schedule within which both quantity dispensed and times when dispensed are user definable. Liquid feed is allowed to flow from a bulk storage vessel by lowering a transfer pipe a predetermined distance into the storage vessel, thereby allowing the liquid feed to gravity flow from the storage vessel to a feeding vessel. The control of dispensing time and the quantity of liquid feed dispensed is accomplished through the use of a microcomputer which can be programmed to enable the dispensing of liquid feed for two time periods in a 24-hour cycle.

8 Claims, 26 Drawing Sheets

Regulate Source Code setpoint storage addresses
20-21 = time of day
22-23 = start time 1
24-25 = stop time 1
26-27 = start time 2
28-29 = stop time 2
2A-2B = hold minutes
2C-2D = motor distance units 1/10 inch register assignments
R7  = seconds counter
R6  = hold minutes counter
R5  = minutes register
R4  = hours register
R0  = index pointer
F0  = time 1 or time 2 flag
F1  = timer on - off flag store ascii value for message
---------------------------------------------------------
| ASCII 0300H | " -TIME- " |
| ASCII 0308H | "SET TIME" |
| ASCII 0310H | "STOP #1 " |
| ASCII 0318H | "STOP #2 " |
| ASCII 0320H | "START #1" |
| ASCII 0328H | "START #2" |
| ASCII 0330H | "WAIT min" |
| ASCII 0338H | " -UNITS-" |
| ASCII 0340H | " -TEST- " |
| ASCII 0350H | "0123456789ABCDEF" |
| ASCII 0360H | "C1993-REG0293-GS" |

```
            START OF REGULATE PROGRAM
      ADDR 000H      ---------------------------------
      NOP
      CPL F0        set start to select #1 time option
      CALL INIT     power up initialization MAIN  JTF CNTR      jmp if counter overflow flag set
      MOV A,R7      check to see if seconds counter is 0
      JNZ MNA       if it is not then skip next part
      MOV R0,#20    time of day pointer
      MOV R7,#3C    restore seconds counter to 59
      CALL INCT     increment time by 1 min.
      MOV A,#00     address for " -TIME- " message
      CALL DSPM     display message
      CALL DSPT     display time from R4 and R5
      CALL REGC     regulate time control prog MNA   CALL MOTOR    check and run motor if motor count >0
      OR P1,#FF     set up port 1 as inputs
      IN A,P1       get switch data
```

FIG. 14

```
        CPL A
        JZ MAIN       loop if no switches
        CALL SWTCH    go to selected sub
        JMP MAIN      main program loop
        NOP
        NOP Up-date counter for next minute
        ---------------------------------------------
CNTR    DEC R7        seconds counter -1
        MOV A,T       get counter data
        ADD A,#38     offset for /200
        MOV T,A       put counter data back
        JMP MAIN Initialize system values
        ADDR 0030H    ---------------------------------------------
INIT    MOV A,#CF     set up port 2
        OUT P2,A
        OR P1,#FF     set up port 1
        CLR A
        MOV R6,#00    clear hold counter
        MOV R0,#20    clear all time values
        MOV R1,#10
        MOV R7,A      clear seconds counter
ITA     MOV @R0,A
        INC R0
        DJNZ R1,ITA   repeat until done START CNT     start counter mode
        MOV A,#38     8 bit mode 5X7 format 2 line
        CALL COUT     send out command to LCD display
        MOV A,#0D     display on command
        CALL COUT
        MOV A,#06     right shift cursor mode
        CALL COUT
        RET Get time data from @R0 into R4 and R5
        ---------------------------------------------
GTD     MOV A,@R0
        MOV R4,A
        INC R0
        MOV A,@R0
        MOV R5,A
        DEC R0
        RET Save time data from R4 and R5 into @R0
        ---------------------------------------------
STD     MOV A,R4
        MOV @R0,A
        INC R0
        MOV A,R5
```

FIG. 15

```
        MOV @R0,A
        DEC R0
        RET
```

Decrement time value R0, by 1 minute steps
```
DECT    CALL GTD    get time data into r4,r5
        MOV A,R5
        JZ DCB      jump if minutes =0
        AND A,#0F   check 1's digit =0
        JZ DCA
        DEC R5
        JMP DS
DCA     MOV A,R5
        CPL A       invert a
        ADD A,#07   subtract 7
        CPL A
        MOV R5,A
        JMP DS
DCB     MOV R5,#59  reset to 59 minutes
        MOV A,R4    get hours
        JZ DCC
        AND A,#0F
        JZ DCD
        DEC R4
        JMP DS
DCD     MOV A,R4
        CPL A
        ADD A,#07
        CPL A
        MOV R4,A
        JMP DS
DCC     MOV R4,#23  reset hours to 23
DS      CALL STD    store data back into @R0
        RET
```

Increment time values by 1 minuite steps
```
INCT    CALL GTD    get time data into R4 and R5
        MOV A,R5
        ADD A,#01
        DA A
        MOV R5,A
        XOR A,#60   check for 60 minutes
        JNZ INA     if not then skip to hours
        XCH A,R5    set minuites to zero
        MOV A,R4    get hours
        ADD A,#01
        DA A        decimal adjust
        MOV R4,A
        XOR A,#24   check for 24 hours
        JNZ INA
        XCH A,R4    reset hours to zero
INA     CALL STD    store time data to @R0
```

FIG. 16

```
                    RET

Output commands from A to LCD display
        ---------------------------------------------
COUT    AND P2,#C0    select command mode
        OUT P1,A      send data
        OR P2,#10     strobe E line
        AND P2,#E0
        RET send out data from A to display
        ---------------------------------------------
DOUT    OR P2,#20     select data mode
        OUT P1,A      send out data
        OR P2,#10     strobe E line
        AND P2,#E0
        RET display message @A from page 3
        ---------------------------------------------
DSPM    MOV R2,A      save message address
        MOV A,#80     display address 0 command
        CALL COUT     send out command
        MOV R3,#08    set up for 8 characters
DSA     MOV A,R2      get message address
        MOVP3 A,@A    replace with character from page3
        CALL DOUT     output data character
        INC R2
        DJNZ R3,DSA
        RET Display time data to LCD
        ---------------------------------------------
DSPT    CALL GTD      get time values from @R0 into R4 and R5
        MOV A,#C0     address of second half of display
        CALL COUT     send out command
        MOV A,#20     send out space
        CALL DOUT
        MOV A,#2D     output a - character
        CALL DOUT     send out data character
        MOV A,R4      get hours data into A
        CALL DSPD     convert binary data to ascii and send out
        MOV A,#3A     output a : character
        CALL DOUT
        MOV A,R5      get minutes
        CALL DSPD     send out
        MOV A,#2D     output a - character
        CALL DOUT     display should look like -04:35-
        RET
        NOP
        NOP
        NOP convert binary number to ascii and send to display
```

FIG. 17

```
DSPD    MOV R2,A      save data value in r2
        SWAP A        get upper time digit in place
        AND A,#0F     clear unwanted digit
        OR A,#50      add base address for ascii table
        MOVP3 A,@A    get ascii value for number
        CALL DOUT     send ascii number to LCD display
        MOV A,R2      get time data back
        AND A,#0F     select lower digit
        OR A,#50      add base address
        MOVP3 A,@A    get ascii data from table
        CALL DOUT     send out to LCD display
        RET
        NOP
        NOP
```

```
              Switch jump table
        ADDR 0100H  ------------------------------
SWTCH   JB7 STOP      set stop times 1 and 2
        JB6 START     set start times 1 and 2
        JB5 TIME      set time of day
        JB4 HOLD      set wait time between cycles
        JB3 TEST      test cycle
        JB2 MTU       motor time units
        RET
        NOP
        NOP
```

```
              Enter stop time data
        ADDR 0110H  ------------------------------
STOP    MOV R0,#24    stop time 1
        MOV A,#10     stop 1 message
        JF0 SPA
        MOV R0,#28    stop time 2
        MOV A,#18     stop 2 message
SPA     CPL F0        time 1 or 2 flag
        CALL DSPM     display message
        CALL DSPT     display time data
SPB     CALL ICDC     add or subtract time
        JB7 SPB       wait for release of stop button
        RET
        NOP
        NOP
```

```
              enter start times
        -------------------------------------------
START   MOV R0,#22    start time 1
        MOV A,#20     start 1 message
        JF0 STA
        MOV R0,#26    start time 2
        MOV A,#28     start 2 message
STA     CPL F0        time 1 or 2 flag
        CALL DSPM     display message
        CALL DSPT     display time data
```

FIG. 18

```
STB     CALL ICDC      add or subtract time
        JB6 STB        wait for release of start switch
        RET
        NOP
        NOP
``` set hold time

```
HOLD    MOV R0,#2A     wait time
        MOV A,#30      wait message
        CALL DSPM      display message
        CALL DSPT      display time data
HOA     CALL ICDC      add or subtract time
        JB4 HOA        wait for release of hold switch
        RET
        NOP
        NOP
``` set time of day

```
TIME    MOV A,#08      set time message
        MOV R0,#20     address of time data
        CALL DSPM      display sub
        CALL DSPT
TIA     CALL ICDC      add + or - time
        JB5 TIA        wait for release of hold switch
        RET
        NOP
        NOP
``` enter motor counter units

```
MTU     MOV R0,#2C     motor time units
        MOV A,#38      motor units message
        CALL DSPM      display message
        CALL DSPT      display data
MTA     CALL ICDC      add or subtract
        JB2 MTA        repeat until units switch released
        MOV R4,#00     erase any motor units > 59
        CALL STD       store data for motor
        RET
        NOP
        NOP
```

Increment or decrement time values

```
ICDC    MOV R1,#20     value for a 3 second timeout
ICLC    OR P1,#FF      set up switch input
        IN A,P1
        CPL A
        JB1 ICA        test - switch for dec
        JB0 ICB        test + switch for inc
        JMP ICC        if no switch then return
ICA     CALL DECT      decrement time
```

FIG. 19

```
            CALL DSPT    display time
            JMP ICD
ICB         CALL INCT    increment time
            CALL DSPT    display time ICD         CALL WAIT1   wait .1 seconds
            OR P1,#FF
            IN A,P1      get switch data
            CPL A
            JB1 ICE      test switches
            JB0 ICE
ICC         RET          quit if switch released ICE         MOV A,R1     check timeout counter for 0
            JZ ICLC
            DEC R1       dec timeout loop counter
            JMP ICD
            NOP
            NOP
``` push motor units into cycle register to test it
-----------------------------------------------
```
TEST   MOV A,#40      test message address
       CALL DSPM
       MOV R0,#2D     address of user set units
       MOV A,@R0      get user set units
       SEL RB1        select alternate register
       MOV R4,A       put units into motor controll reg
       SEL RB0        return to normal registers
       CALL RHV       restore hold register value
       RET
``` compare on and off times and set timer flag
-------------------------------------------
```
TIMER  MOV R0,#20     get time value from memory
       CALL GTD       move it into R4 and R5
       MOV A,R4       save current time value in R2 and R3
       MOV R2,A
       MOV A,R5
       MOV R3,A
       MOV R0,#22     start1 time address
       CALL GTD       get start1 time
       CALL COMP      compare time values for =
       JNZ TMA        if start1 = time of day then
       CLR F1
       CPL F1         turn on timer flag
TMA    MOV R0,#24     stop1 time address
       CALL GTD       get stop1 time data
       CALL COMP      compare time values
       JNZ TMB        if stop1 = time of day then
       CLR F1         turn off timer flag
TMB    MOV R0,#26     start2 time address
       CALL GTD       get data
       CALL COMP      compare times
       JNZ TMC
       CLR F1
```

FIG. 20

```
            CPL F1      turn on timer flag
    TMC     MOV R0,#28  get stop2 time
            CALL GTD
            CALL COMP
            JNZ TMD
            CLR F1      turn off timer flag
    TMD     RET
``` compare time values   return A=0 if match
---

```
    COMP    MOV A,R2    compare time r2,r3 with
            XOR A,R4    time data in r4,r5
            JNZ CMA
            MOV A,R3
            XOR A,R5
    CMA     RET         return a=0 if values match
``` regulate control program
---

```
    REGC    CALL TIMER  compair time and set timer flag
            MOV A,R6    get wait timer value
            JZ RGA      if r6 wait timer >0 then
            DEC R6      count r6 timer down by 1 min
            RET         and return
    RGA     JF1 RGB     if timer flag is on then continue
            RET         else return
    RGB     NOP
            NOP
            IN A,P2     get switch data
            JB7 RGC     check float switch for 1
            RET         if not then return
    RGC     MOV R0,#2D  address of motor units
            MOV A,@R0   get data
            MOV R2,A    save data for conversion to binary
            AND A,#F0   mask off 10s digit
            SWAP A
            MOV R1,A    save 10s digit
            MOV A,R2    get origional number
            AND A,#0F   mask for ones digit
    RGD     ADD A,#0A   add 10 to A
            DJNZ R1,RGD repeat until done
            SEL RB1     select alternate reg
            MOV R4,A    store number for motor sub
            SEL RB0     get origional register back
            CALL RHV    restore hold value to R6
            RET
``` wait for 1024 machine cycles
```
            ADDR 0200H  ---------------------------------
    WAIT1   MOV A,#55   wait for 1024 machine cycles
    WTA     DEC A
            NOP
            JNZ WTA
            RET
            NOP
```

FIG. 21

```
                NOP check for units in motor register and count to 0
                    ------------------------------------------------
        MOTOR   SEL RB1     select reg for motor data
    ?           MOV A,R5
    ?           JNZ MRE     check motor units for 0
                MOV A,R4
                JZ EDM      if r4 =0 then quit
                DEC R4
                MOV R5,#0A  motor counts/.01 inch * 2
        MRE     INC R0      inc delay counter
                MOV A,R0    get timer and
                JNZ GMD     test it for 00  if it is
                INC R1      inc timeout R1
                MOV A,R1    get timeout data and
                AND A,#F0   check if it is > 8 (about 4 seconds)
                JZ GMD      if not then go on to next part
                MOV R5,#00  if it is then clear all motor
                MOV R4,#00  units to stop motor from running
                JNZ EDM
        GMD     OR P2,#C0   set up to get switch data
                OUT P4,A    send out motor on pulse
                MOV A,R5    get motor count data
                JB0 MRA     jump if odd number
                IN A,P2     get switch data
                JB6 MRB     check for motor pulse low
                DEC R5      if low then dec r5
                MOV R1,#00  clear timeout counter
        MRB     JMP EDM MRA     IN A,P2     get data
                CPL A       invert it
                JB6 EDM     check for motor pulse hi
                DEC R5      if hi then dec r5
                MOV R1,#00  clear timeout counter
        EDM     SEL RB0     return to main registers
                RET restore register values
                ADDR 0240H  ------------------------
        RHV     MOV R6,#00  clear R6
                MOV R0,#2A  hold data address
                MOV A,@R0   get hold time hours
                JZ RHA      skip if hours =0
                MOV R6,#3C  load R6 with 60 minuits
        RHA     INC R0      next address
                MOV A,@R0   get hold minuits
                AND A,#F0   mask for 10s digit
                JZ RHB      if 10s digit =0 then skip to minuits
                SWAP A      exchange
                MOV R1,A    set up loop counter
                MOV A,R6    get hold data from R6
        RHC     ADD A,#0A   add 10s to counter value
                DJNZ RHC    repeat until done
```

FIG. 22

```
        MOV R6,A      save hold counter
RHB     MOV A,@R0     get hold minutes again
        AND A,#0F     mask for ones digit
        ADD A,R6      add ones digit to counter value
        MOV R6,A      put total hold value back into R6
        JZ RHD        check for 0 if not then
        DEC R6        adjust wait value for extra minute
RHD     RET
```

FIG 23

PORTABLE PROGRAMMABLE LIQUID FEED DISPENSING DEVICE

BACKGROUND OF THE INVENTION

1. Technical Field

This invention generally relates to an apparatus for controlling the feeding of liquid feed to livestock. More particularly, this invention relates to a portable programmable device for the feeding of liquid feed to livestock in controlled quantities and at controlled times.

2. Background Art

A common practice within the livestock industry, is to utilize liquid feed products to provide supplemental nutrients and feed additives to animals. These liquid feeds are manufactured by solubilizing or suspending a wide range of individual ingredients that contain specific nutrients and feed additives within a variety of liquid carriers, such as molasses, fermentation solubles, condensed whey, etc. These finished products are then fed to the animals. There is a wide variation in the application of these liquid feed products as they are fed to variable numbers within the feeding groups as well as various classes, weights and ages of animals. Frequently, it is inconvenient to combine the liquid feed with other feed ingredients prior to feeding, and consequently they must be provided to the animals as a separate ingredient and in a manner in which the animals have unlimited access to the liquid feed in an undiluted form. Unfortunately, it is oftentimes difficult to constrain the animals voluntary intake within a range which provides for maximum response to the nutrients and feed additives. Over feeding of nutrients and additives is wasteful and will adversely affect the return on the feeding investment. Also, animal health and mortality can be affected if the nutrients and feed additives are not provided at the prescribed rate. For this reason there are governmental regulations which specifically control the allowable levels or dose for some nutrients and feed additives. Furthermore, when these feed additives are provided on a basis where the animals are given unlimited access to a feed source in which the additives are included, the manufacturer must provide demonstrable evidence that the average twenty-four hour consumption for the group of animals being fed will provide the feed additive at a level which falls within the required dose range for that particular feed additive.

In addition to the need for regulating the quantity of liquid feed fed, it has also been demonstrated that the timing in which the nutrients and feed additives are provided has an effect on production. For example, it has been demonstrated that cattle grazing on pasture will consume more grass when supplemental feeds are not made available until the afternoon of each day. By consuming more grass, the animals have more energy to support production and this results in an increase in performance and average daily gain for each animal. In a like manner, it has been demonstrated that the death loss which can be associated with cattle grazing legume pasture in a rotational grazing system, can be reduced or eliminated if the cattle consume a liquid feed containing a feed additive which affects the surface tension of gas bubbles formed in the animal's rumen. The ability to control bloat in these applications is enhanced if the cattle consume this additive approximately one hour before they are moved to a new pasture containing the legumes.

It can be seen that there are a wide variety of liquid feed needs from one location to another and the needs change throughout the year. Therefore, there are a wide variety of formulations required to meet these needs and any feeding system must easily accommodate change in regards to quantities being fed, timing at which the liquid feed is made available and varying product composition.

The application of liquid feeds of the type previously described are most often accomplished in remote locations. More often than not, it is economically impractical to provide the labor required for daily hand feeding operations. Because of a lack of convenient access to an AC power source it is necessary to have feeding systems which require no power or which can be operated on a DC power source for long periods of time. The feeding system must also be readily portable as the animals are frequently moved from one confined feeding area to another.

Prior art solutions to the needs described above have generally relied on methods and devices directed towards affecting the quantities of liquid feed being voluntarily consumed as opposed to those directed towards controlling the amount actually dispensed and being made available for voluntary consumption. One common method has been to decrease voluntary intake of the liquid feed by lowering its relative palatability. An example of this approach would be the practice of incorporating increased levels of a specific ingredient such as salt within the liquid feed. This can affect the animals sense of taste in such a way as to sometimes lower the animals voluntary intake. Another method of reducing voluntary intake has been to provide a means for applying increased tension on a revolving lick wheel that is acting as a liquid feed pickup device. This increased tension will result in the animals requiring more time and effort to consume a specified quantity of liquid feed and this may also lower voluntary intake.

The prior art specifically describing liquid feed dispensing devices which can provide a means of controlling the quantity of liquid feed that is dispensed within a specified period of time to one or more animals is lacking. Typically the devices available can be best described as constant flow or constant level devices which allow the animals access to unlimited quantities of liquid feed or they may be designed to provide access to unlimited quantities of liquid feed during specified periods of time. Unlike the invention which we will describe these devices typically utilize a pressurized source of liquids, an AC powered electric control circuit and some type of automated control valve. Additional mechanical elements common to prior art but which also fall outside our invention are pumps, hydraulic cylinders, vacuum valves, air pressure valves, weighing systems, float valves, stopper plugs, metering valves, metering orifices and batch dumping cylinders.

More specifically, U.S. Pat. No. 3,347,212 to ANDERSON ET AL. discloses an apparatus for the feeding of liquid feed to livestock on a continuing output basis. This is accomplished by lowering a flexible hinged transfer tube through a vertical plane in a storage vessel containing liquid feed thereby allowing the liquid feed to gravity flow through the tube and into a liquid feed pickup device. It can then be accessed by the livestock through a lick ball. The device described by this patent utilizes a predicted rate of descent as a means of dispensing liquid feed on a constant flow basis. The rate of descent is controlled through the use of a battery assisted spring wound clockwork motor and integrated unwinding cable working in conjunction with a spool assembly fitted with multiple diameters the use of which allows for selecting differing rates of descent by the drop tube assembly. The element of time in the device described by this patent only has meaning in respect to affecting the rate of descent. As soon as automated feeding is initiated the control means will continue on a basis that is only manually interuptable and therefore the transfer tube will normally continue to drop through the fluid until it rests on the bottom of the supply vessel. Thus it can be seen that the quantity of liquid feed automatically dispensed is totally independent of the liquid feed actually consumed by the livestock during the total dispensing period. This period being the time required to allow the transfer tube to travel from the top of the liquid level to the bottom of the storage vessel. This system has a number of disadvantages as applied under practical feeding situations. The primary deficiency of this invention is that if the voluntary consumption is less than the projected rate the potential consumption is accumulated. This can continue to a point where the total remaining feed in the storage vessel is essentially all available. Therefore, there is no means of protecting the livestock against excessive consumption when there has been a period of time when consumption is less than projected in establishing the rate of decent. This is particularly a problem when the number of cattle placed in a particular feeding area are being changed from one day to the next. This is a common livestock management practice. Another disadvantage of the device described by this patent is that the use of controlled rate of descent as applied in a battery operated system results in a significant opportunity for error. A small difference in the total distance traveled by the transfer tube can make a significant difference in the total quantity of liquid feed dispensed. The effective voltage potential in a battery powered operation can vary significantly depending on the batteries remaining charge or the batteries effective ambient temperature . This drop in voltage output will produce a corresponding drop in revolutions and or a sporadic disfunctioning of the clockwork motor and thereby changes the effective distance of downward travel by the transfer tube. Furthermore, the opportunity for inaccuracy and the lack of an ability to time the feeding periods in a more specific manner give rise to the significant need for our invention.

DISCLOSURE OF INVENTION

Each of the devices described in the prior art have disadvantages in terms of their effectiveness in achieving our desired results.

Therefore, the primary object of the invention is to provide a portable programmable device for the feeding of liquid feed on an accurate and repeatable basis and which allows control of the quantity of liquid feed dispensed and the timing at which the liquid feed is dispensed. This is accomplished by providing a means which allows for feeding liquid feed within definable blocks of time in a 24 hour period. Furthermore, the means allow for definable increments of time between liquid feed dispensing cycles within the definable blocks of time.

Another object of this invention is to provide a control device that when appropriately integrated with a storage vessel of uniform and proportional dimensions and which when fitted with an appropriately designed transfer tube assembly will transfer a known quantity of liquid feed in proportion to each measurable drop made by the transfer tube within the liquid feed in the storage vessel. Furthermore, to control the drop in elevation of the transfer tube assembly in such a manner that the amount of programmed descent is consistent and independent of the rate of descent as affected by the DC batteries voltage potential.

Another object of the invention is to provide a device that will operate on stand alone batteries, a solar assisted battery system, or a supplementary DC power supply that is assisted by a converted AC power source.

Another object of the invention is to provide a high level sensing means within the liquid feeding vessel which will abort the programmed liquid feed dispensing cycle in the event that the animals are unable to consume the programmed quantity of liquid feed dispensed due to less than predicted feed intakes or because some or all of the animals have been removed from the feeding area. Furthermore, the detected level can be adjusted in such a manner that no more than a desired amount of liquid feed can be accumulated within the liquid feeding vessel.

Another object of this invention is to enhance the high level sensing means through the addition of an inverted cup being axially attached in such a manner as to prevent a false conductivity path between the sensor probes and which could result from advancing or receding liquid feed levels.

Another object of the invention is to provide a timing means in the form of a highly accurate 24 hour clock in which time is set by a simple incremental program input method. This clock is continuously being referred to by the control program throughout the devices normal operation.

Another object of the invention is to provide a simple incremental numerical program input method that can allow for accurate feeding of liquid feed on a repeatable basis regardless of the variability of the quantity of liquid feed desired, the time blocks in which the feed could be dispensed, and the definable time increments between liquid feed dispensing cycles within each block of time.

Another object of the invention is to provide a simple incremental numerical program input method that will allow for accurate units of dispensed liquid feed regardless of the size of the storage vessel or liquid feeding vessel being utilized.

Another object of the invention is to provide a simple incremental numerical program input method that will allow for accurate measurable units of dispensed liquid feed on a repeatable basis regardless of the liquid feeds formulation and resulting weight per gallon.

Another object of the invention is to provide a means to display program numerical values in the alpha numeric display while depressing any one of the touch pad input means.

Another object of the invention is to provide a device with a means of testing the actual mechanical response to the current numerical input values of the dispensing units as well as a means of revealing a mechanical or electrical failure.

Another object of the invention is to provide a means for calculating the quantity of liquid feed which has been dispensed on an ongoing basis between times of refilling of the storage vessel by referencing a position marked on the tube elevation cable against a volume index attached to the top of the device support frame.

Another object of the invention is to provide a stop rotation switch means which aborts all dispensing cycles in response to that point when the transfer tube contacts the bottom of the storage vessel.

Another object of the invention is to provide a means which allows for manually controlled dispensing of the liquid feed as required to initially transfer some liquid feed into the liquid feeding vessel or in the event of a mechanical or electrical failure within the control system.

Another object of the invention is to provide a device which allows easy access to the liquid feeding vessel by a variety of classes and size of livestock and which therefore can accommodate a lick wheel, lick ball or open tray as an animal liquid feed pickup device.

These objects and others are accomplished by a battery powered programmable controlled quantity dispensing device for liquid feed which enables measured quantities of liquid feed to be dispensed within programmed time blocks and with programmed increments of time between liquid feed dispensing cycles. Both quantity dispensed and times when dispensing occurs are user definable through a simple input entry device. This device when fitted to an appropriate storage vessel with appropriate transfer tube assembly and appropriate liquid feeding vessel allows the liquid feed to flow from the storage vessel by lowering the mouth of a transfer tube a programmed distance below the liquid level of the storage vessel, thereby allowing the liquid feed to gravity flow from the storage vessel, through the transfer tube and into the feeding vessel. The preferred embodiment of this invention allows for control of measured quantities of liquid feed dispensed as described above, by counting measurable and definable portions of a revolution of any certain drive associated with an output spool. A means is then provided for converting this count into a digital signal that is inputted into the control unit. The control unit utilizes unique program logic which provides for numerical input of all parameters which defines the operational output.

A gear motor assembly drives a spool to which one end of a cable has been attached. The other end of this cable is attached to the transfer tube. As the spool rotates, this cable moves the mouth of the transfer tube up or down depending upon which direction the spool turns. Furthermore, this digital signal produced by the counting process is compared with stored values entered into the microprocessor control circuit through a touch pad entry and accompanying liquid crystal, dot matrix alpha numeric display.

BRIEF DESCRIPTION OF THE DRAWINGS

FIGS. 14–23 list the controller Source Code;

BEST MODE FOR CARRYING OUT INVENTION

Figure 1:
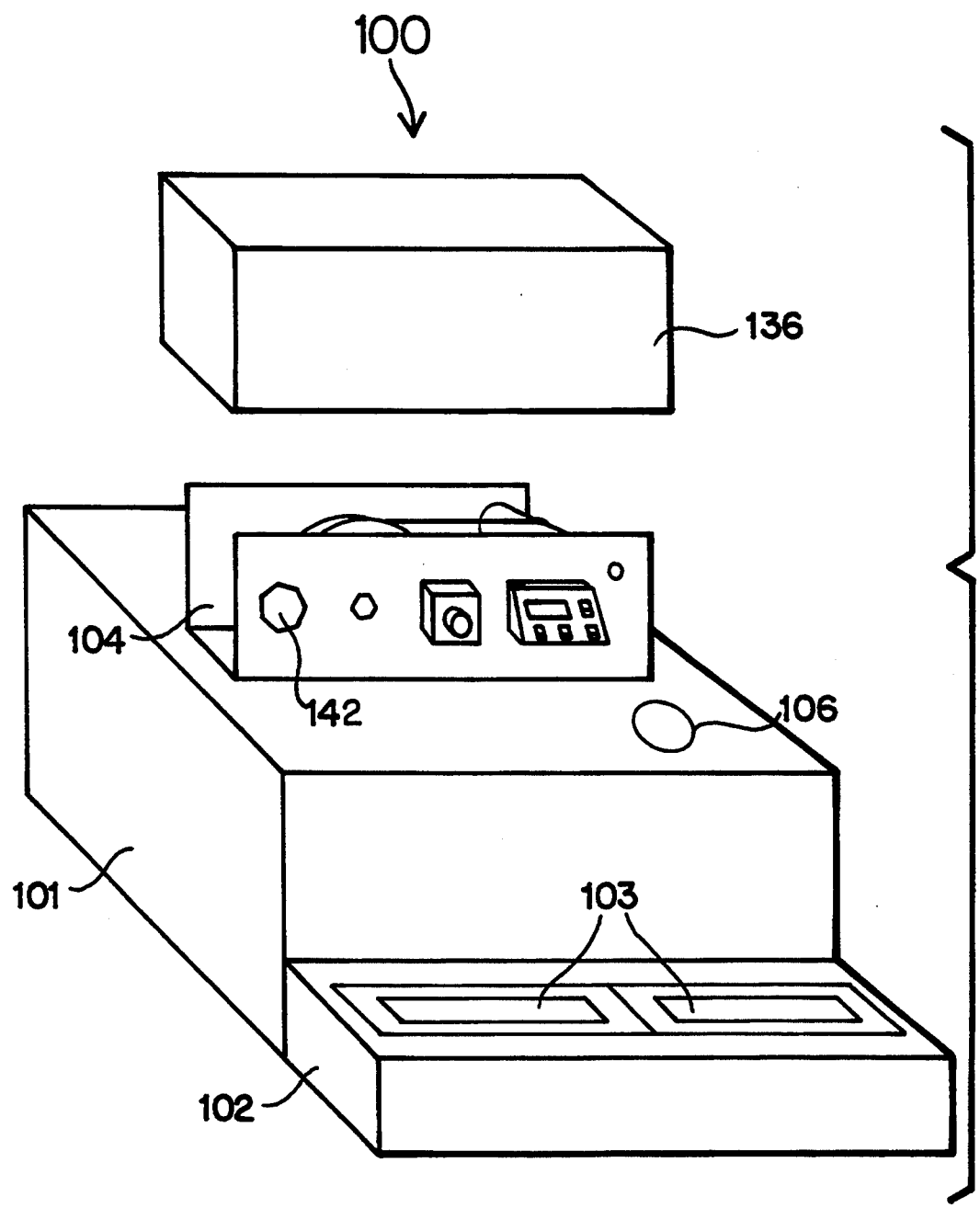
FIG. 1 is a perspective view of the liquid feed dispensing device.
Figure 2:
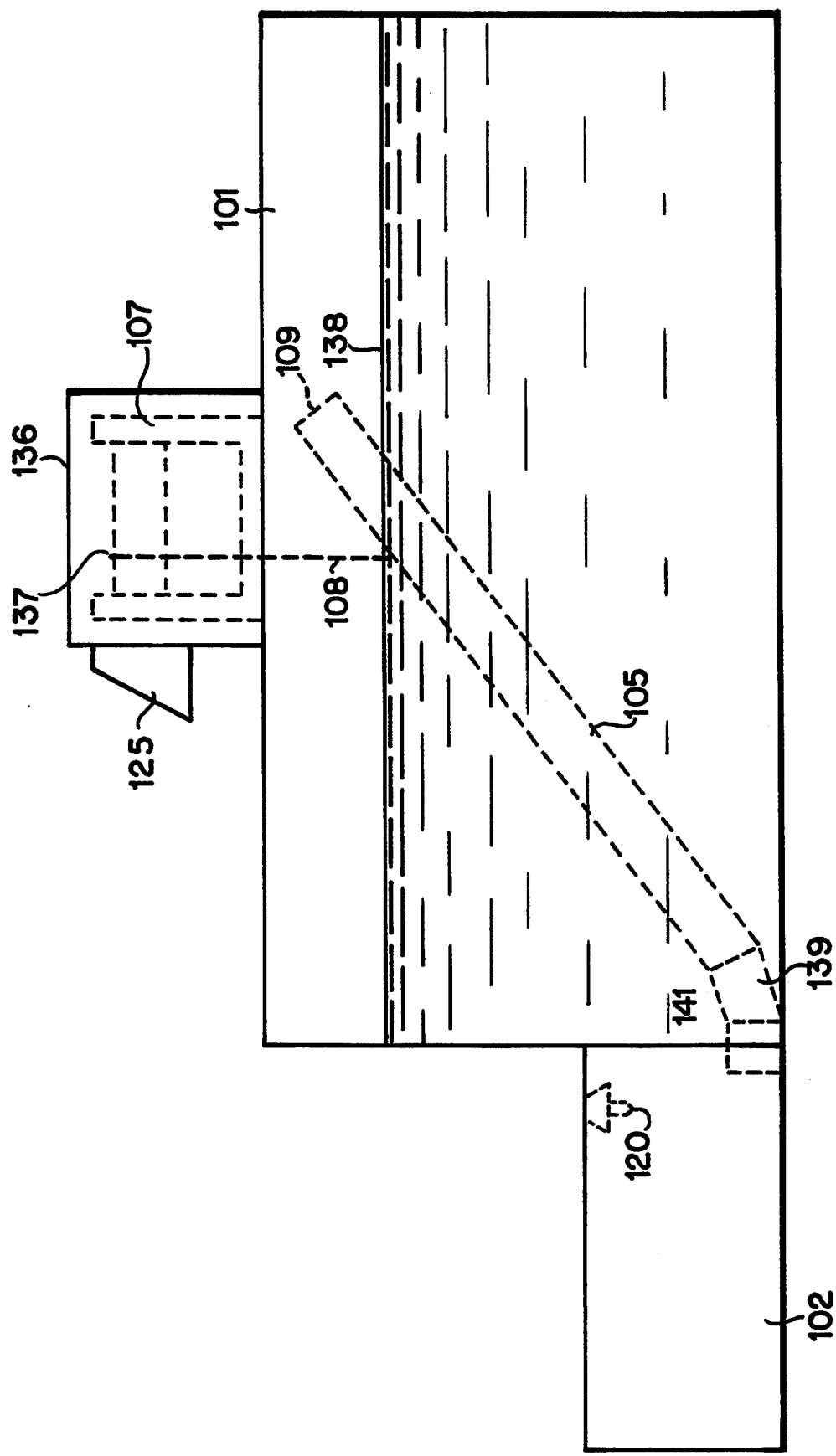
FIG. 2 is a side view of the liquid feed dispensing device.
Figure 3:
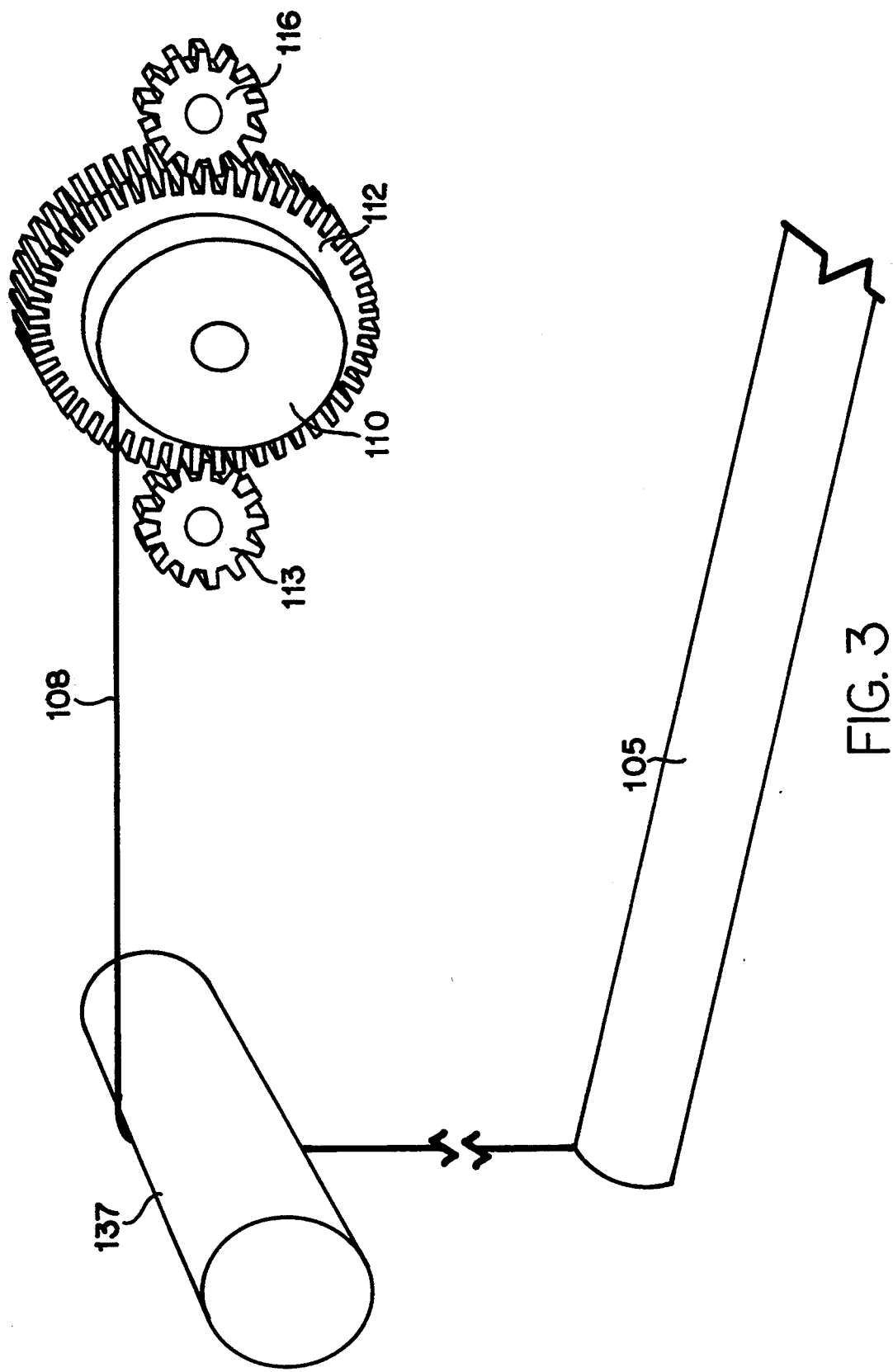
FIG. 3 is a partial representational view of the gear, spool and transfer tube assembly.
Figure 4:
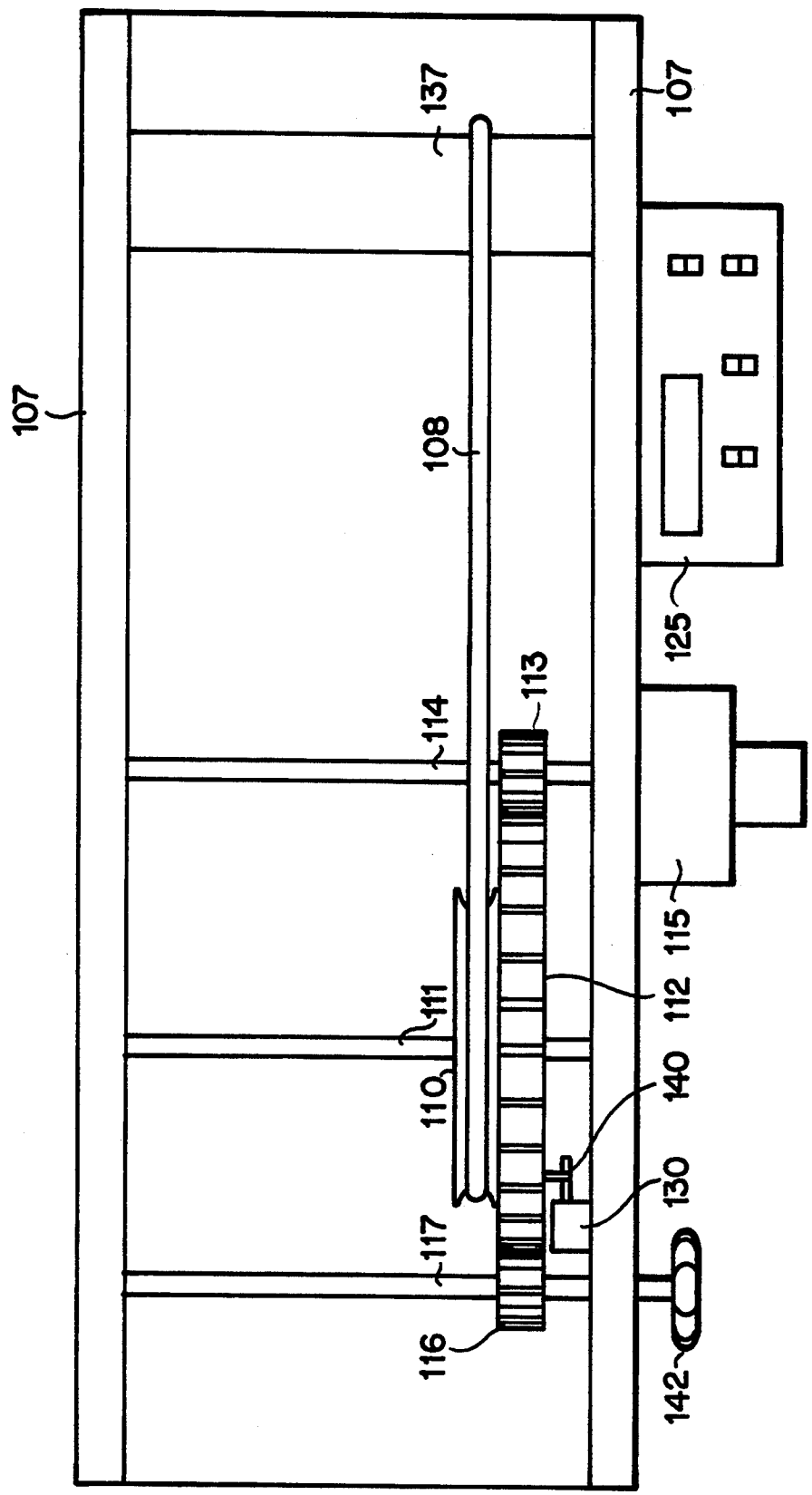
FIG. 4 is a top view of the dispensing controller.
Figure 5:
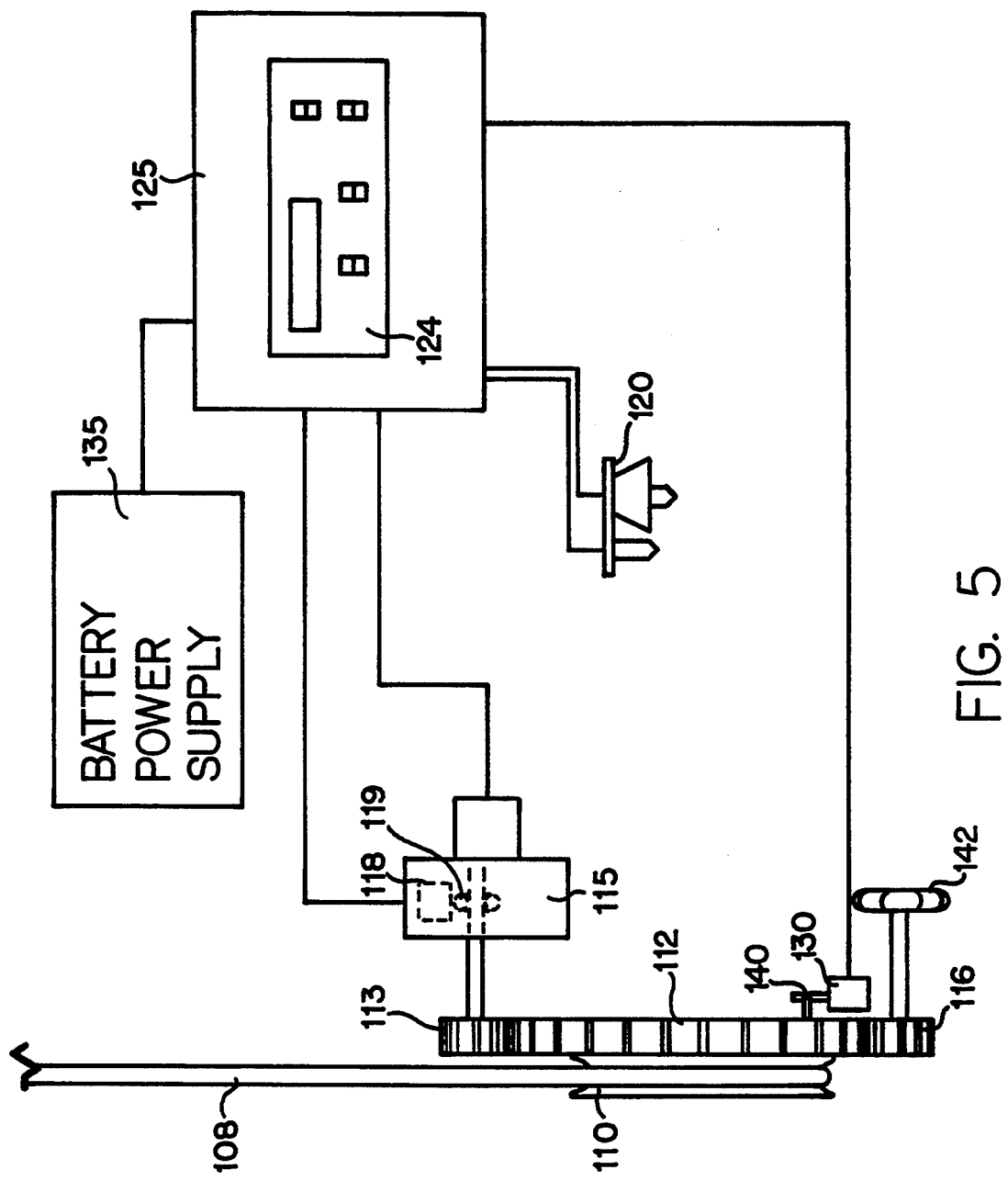
FIG. 5 is a partial representational view of the gear assembly, motor, control circuit, power supply and the liquid level sensor.
Figure 6:
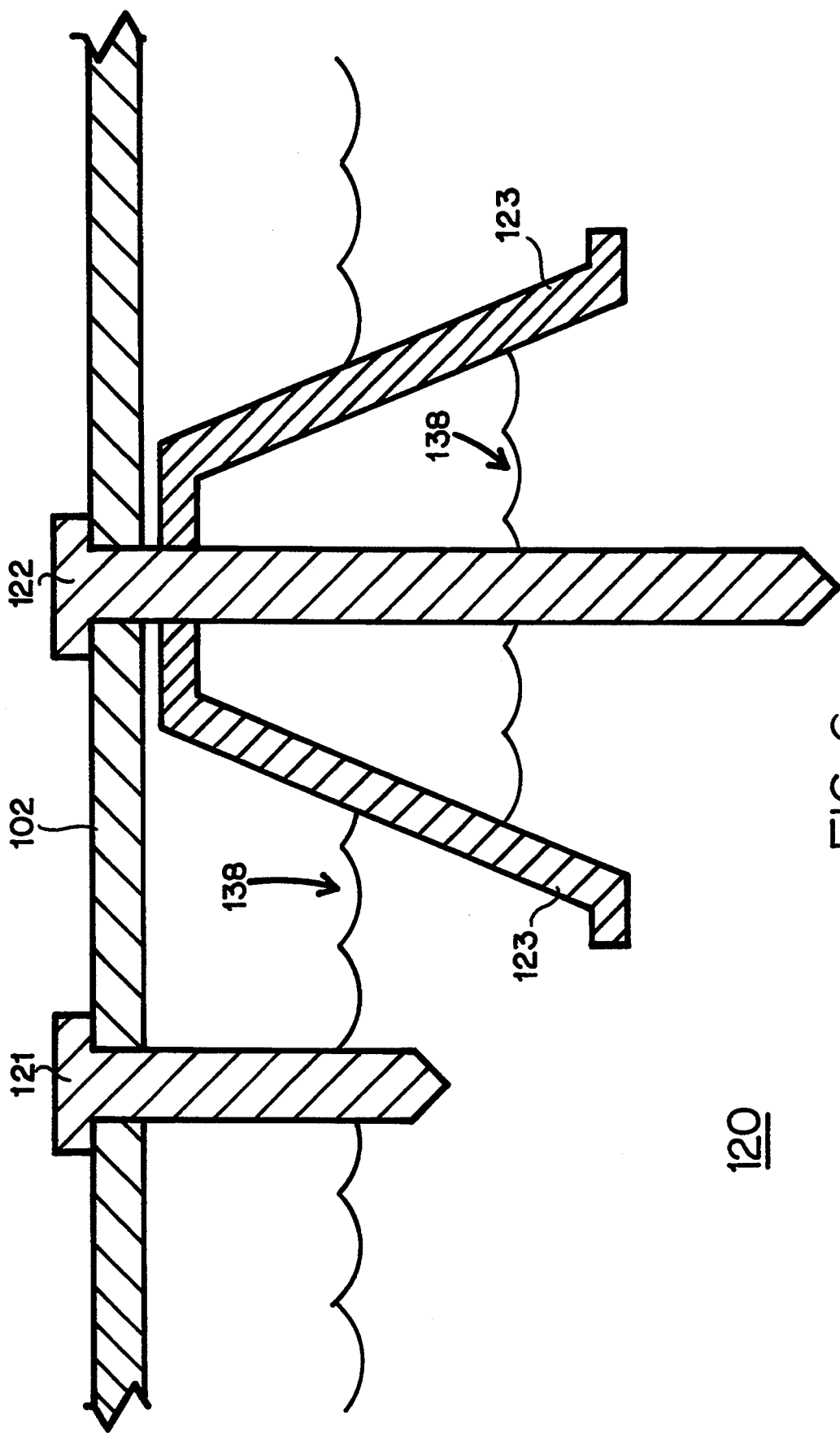
FIG. 6 is a detailed sectional view of the liquid level sensor.

Referring now to FIGS. 1–25 an portable programmable liquid feed dispensing device 100 is illustrated. The liquid feed dispensing device 100 generally consists of a large supply vessel 101, a separate feeding vessel 102 attached to the supply vessel and a self-contained dispensing controller 104. Supply vessel 101 is first filled with a liquid feed of a known specific gravity. A chart is provided and attached to the inside of the vessel, proximate lid 136, which is used to determine the setting of the "dispensing units" value of the dispensing controller 104, which will be explained later. The liquid feed is added to supply vessel 101 through vessel access opening 106, provided at the top, which can be closed when not in use.

A length of rigid tube, transfer tube 105, is located inside supply vessel 101 and has one of its ends attached to a flexible coupling 139. Flexible coupling 139 connects transfer tube 105 to feeding vessel 102 via connecting nipple 141. The other end of transfer tube 105, here designated as transfer tube inlet end 109, is left open and free to move up and down. A length of stainless steel cable, designated as tube elevation cable 108, is attached, by means of a welded eyelet for instance, to transfer tube 105.

The purpose of tube elevation cable 108 is to measurably control the elevation of inlet end 109. As tube elevation cable 108 is let out, inlet end 109 will dip below the surface level 138 of the liquid in supply vessel 101, thus causing the liquid feed to flow into inlet end 109 through transfer tube, flexible coupling 139, connecting nipple 141 and into feeding vessel 102. Supply vessel 101 and feeding vessel 102 are rigidly attached together by a suitable coupling device to prevent damage to the components from livestock.

Dispensing controller 104 consists of four major components. They are, a geared spool assembly 112, a direct current gear motor 115, a battery power supply 135 and a microprocessor based control circuit 125. All of the major components and the not-yet-described supporting components are mounted to the device support frame 107 which is attached to the top of supply vessel 101. Here a "U" shaped frame is used.

Tube elevation cable 108 passes up through a hole in the top of supply vessel 101 and through a hole in the base of device support frame 107. The tube elevation cable 108 then passes over a cable spindle 137 and on to geared spool assembly 112, to which its end is attached. Geared spool assembly 112 is centered on, and affixed to, rotatable spool shaft 111 which is supported by device support frame 107. Tube elevation cable 108 can be manually wound on or off geared spool assembly 112 by means of a handle 142, provided on the left side of dispensing controller 104. Handle 142 is attached to a shaft, designated as adjustment shaft 117, on which manual adjustment gear 116 is also attached. Manual adjustment gear 116 is continuously engaged with geared spool assembly 112, and when manually turned, will rotate resulting in the inlet end 109 of transfer tube 105 being raised or lowered. By this means, an operator may adjust the level of inlet end 109 to the liquid level 138 in the supply vessel 101 to the proper position to start the dispensing cycles or to reel in tube elevation cable 108 so as to prepare to refill supply vessel 101.

Gear motor 115 is attached to one end of drive shaft 114, which is rotatably attached to the side of frame 107 opposite gear motor 115. Drive gear 113 and drive shaft 114 are coupled together by a clutch assembly. Drive gear 113 and geared spool assembly 112 are continuously engaged. This clutch assembly allows for manual adjustment of geared spool assembly 112 while still providing a sufficient friction coupling between the drive shaft 114 and gear motor 115. Power to operate gear motor 115 is supplied from a battery power supply 135 which is controlled by control circuit 125.

A rotation limiting switch 130 is located near geared spool assembly 112 adjacent on the inside surface of device support frame 107 and is activated by a pin 140 located on the side of geared spool assembly 112 at a point which corresponds to a depleted liquid level in supply vessel 101. Additionally, the rotation of geared spool assembly 112 can be limited to maximum and minimum points by screws fastened to the geared spool assembly 112 and to the device support frame 107 in such a way that they interact to prevent the geared spool assembly 112 from being rotated beyond a point which would result in damage to the various components.

A liquid feed level sensor 120 is provided in the top of feeding vessel 102 to sense a specific high liquid level. This will suspend further dispensing cycles, at least while a high level condition exists. Liquid feed level sensor 120 has a short conductive probe 121 and a long conductive probe 122 held in parallel spaced relation, one to the other. The liquid feed provides a path of conductivity between short probe 121 and long probe 122 once both probes come in contact with the liquid feed. An inverted cup 123 is axially attached around long probe 122 and sealed to the inside top surface of feeding vessel 102. In the event that the level of liquid feed rises up into inverted cup 123, an air bubble is formed which prevents the highly conductive liquid feed from coating the uppermost part of long probe 122 or the inside of inverted cup 123, thereby preventing a continuously conductive path of residual material after liquid level recedes. A wire running between liquid feed level sensor 120 and dispensing controller 104 is provided to communicate with the dispensing controller 104 when a high level of liquid feed is sensed.

Liquid level feed sensor 120 serves a dual purpose. Not only does it prevent feed from overflowing the feeding vessel 102, but it also provides a means by which the operator can prevent the liquid feed level from exceeding the maximum desired amount of liquid feed in the feeding vessel, regardless of the programmed dispensing cycle. The operator can select appropriate lengths for probes 121 and 122 which cause the programmed dispensing cycle to be aborted as soon as sensor 120 detects that particular level of liquid. In this way the operator can be assured that the group of livestock being fed never gets more than their prescribed quantity of liquid feed.

Control circuit 125 is a microprocessor based circuit, here employing an appropriate microprocessor such as a 80C39. The Microprocessor 125 gathers information from rotation limiting switch 130, liquid feed level sensor 120, Hall effect transducer 118 and touch pad 124.

Figure 7:
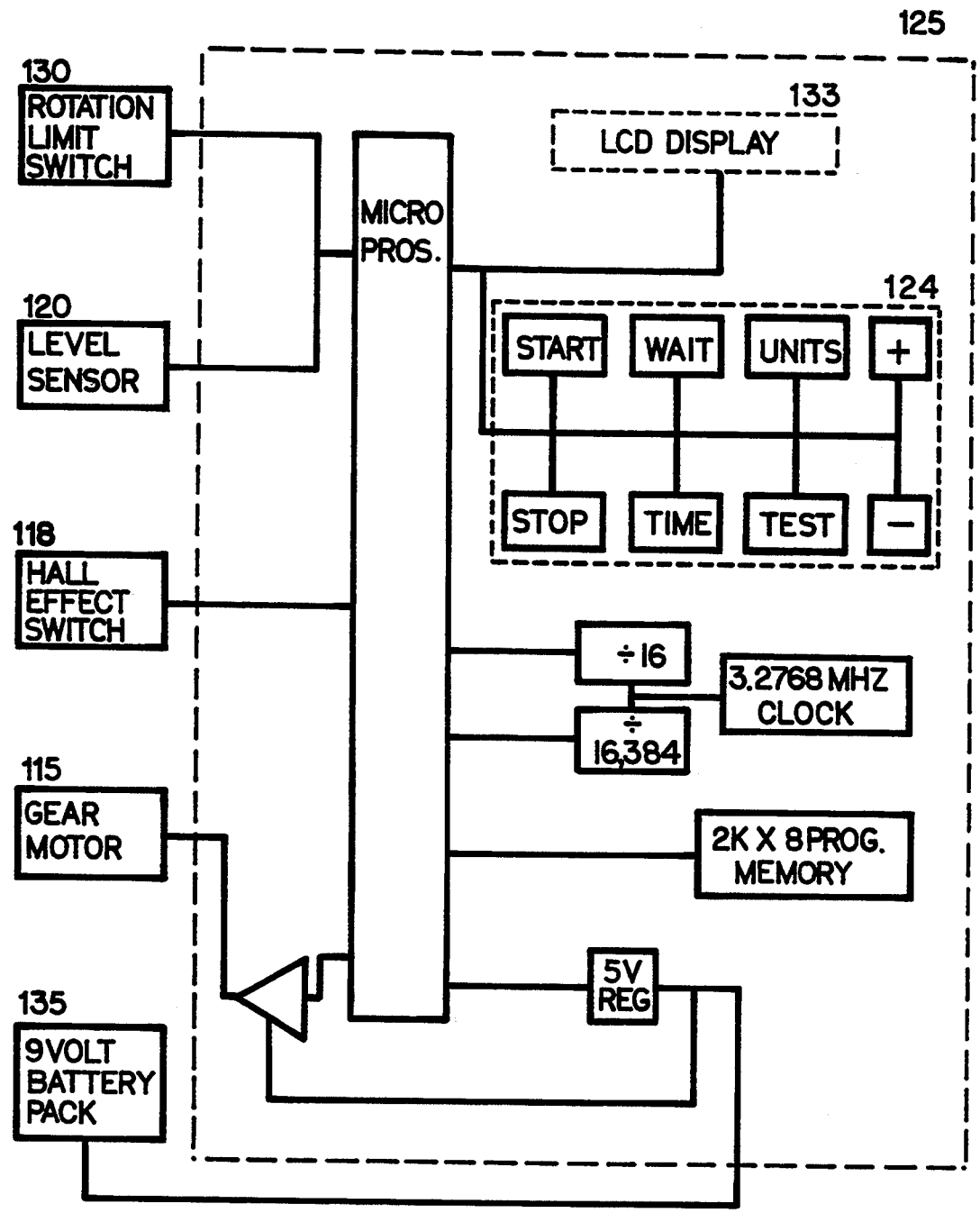
FIG. 7 is a block circuit schematic of the control circuit.
Figure 8A:
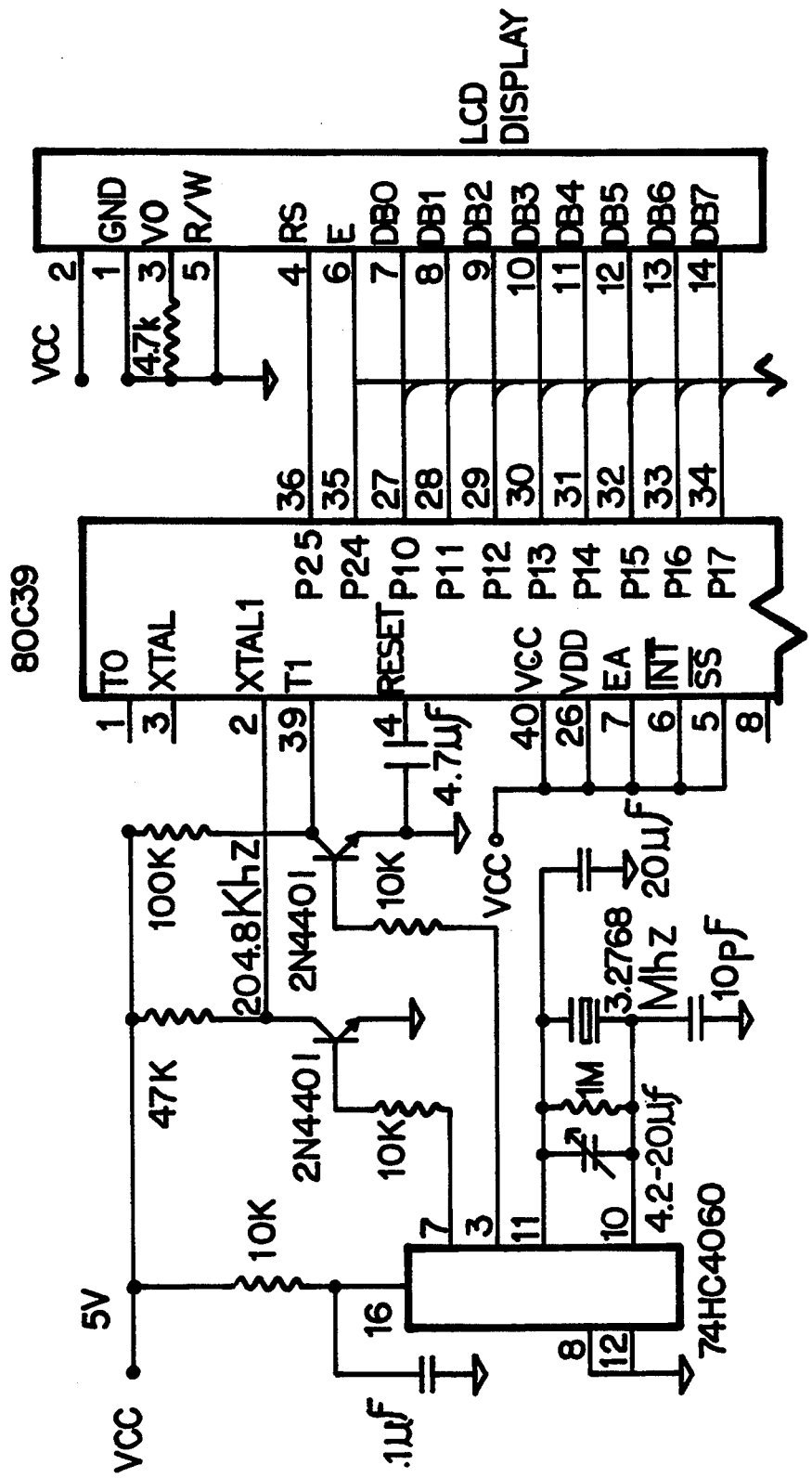
FIGS. 8A and 8B are a partial detailed circuit schematic of the control circuit.
Figure 8B:
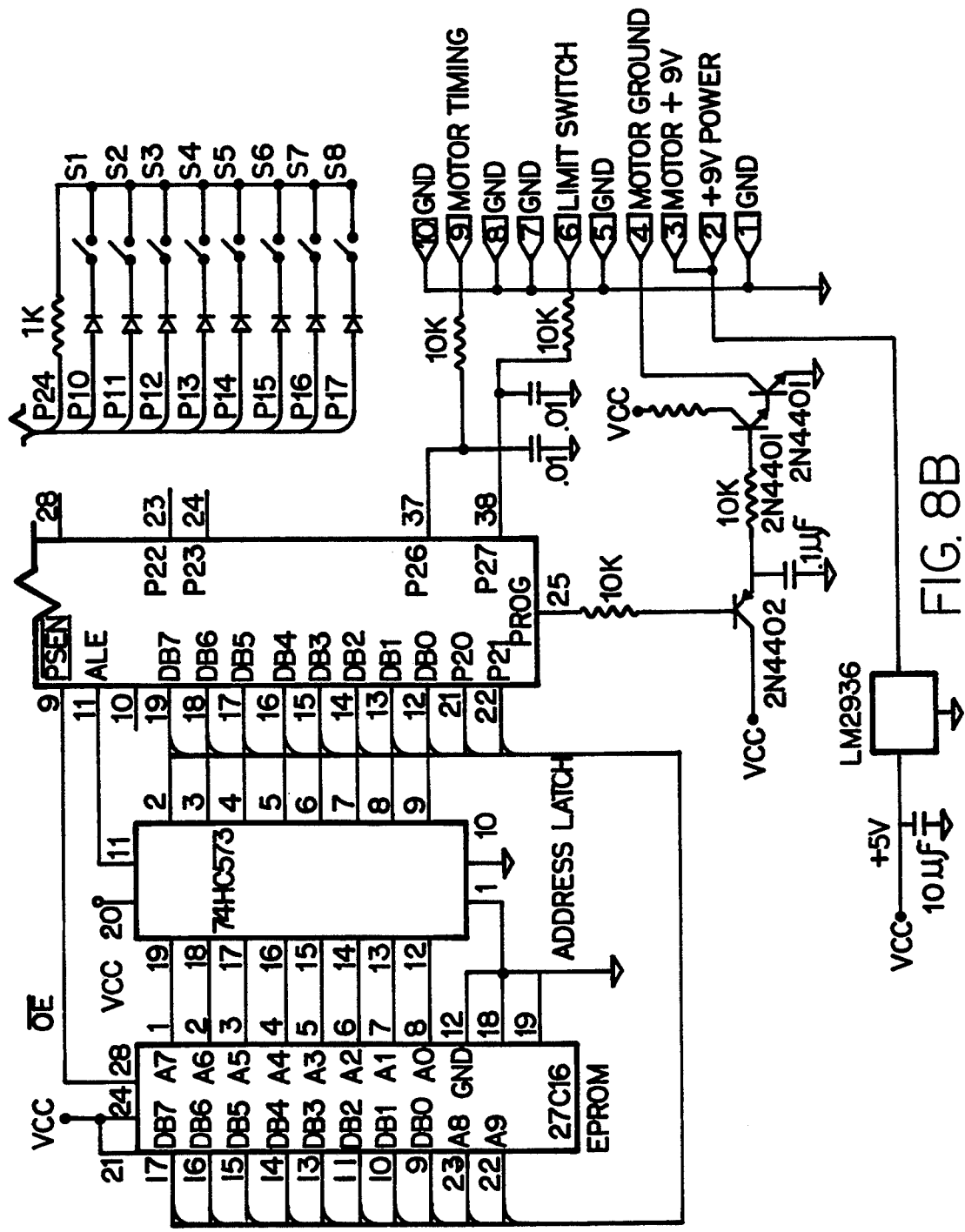
Figure 9:
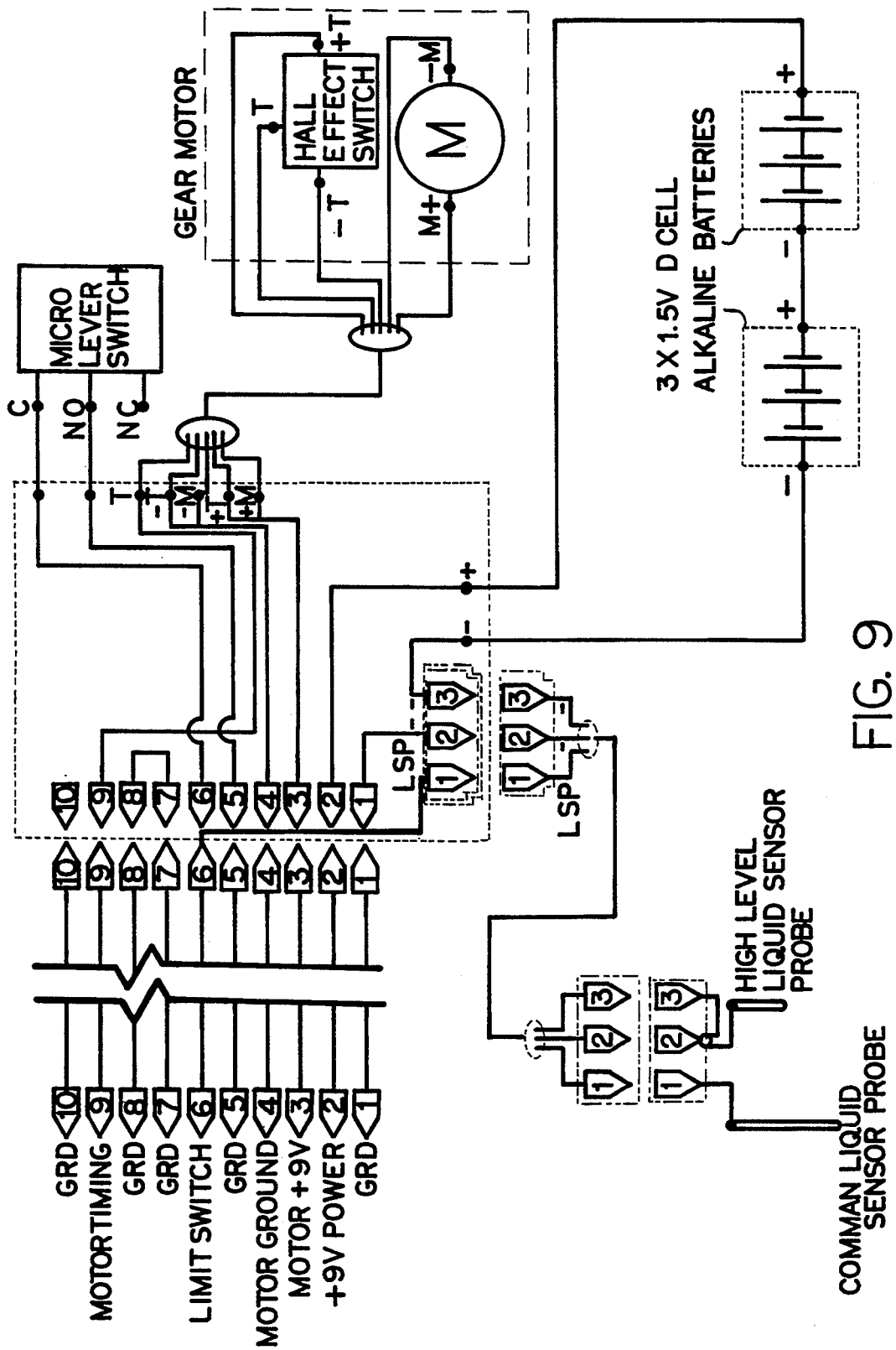
FIG. 9 is a partial detailed circuit schematic of the control circuit.
Figure 10:
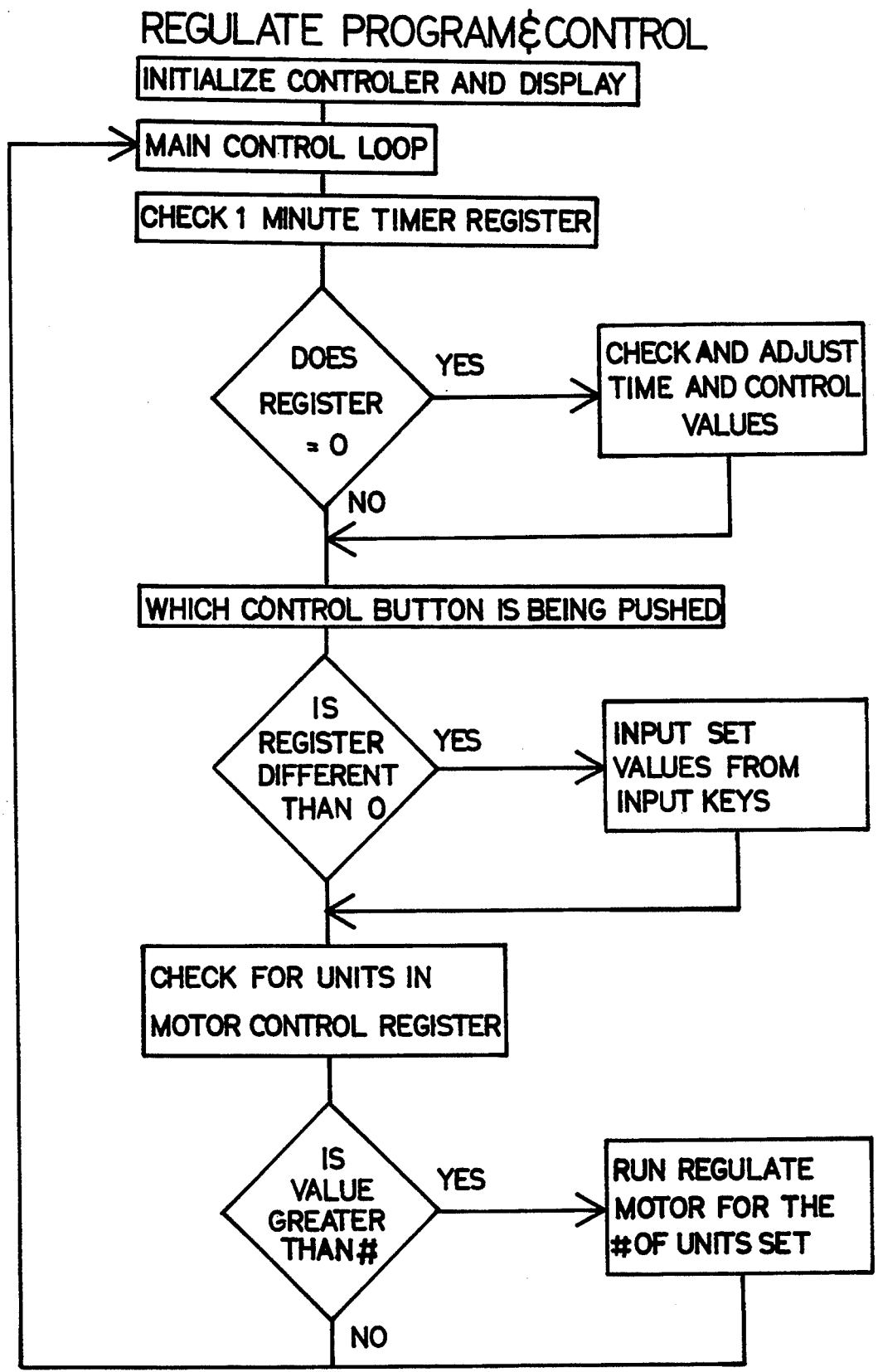
FIG. 10 is a flow diagram of the main control program.
Figure 11:
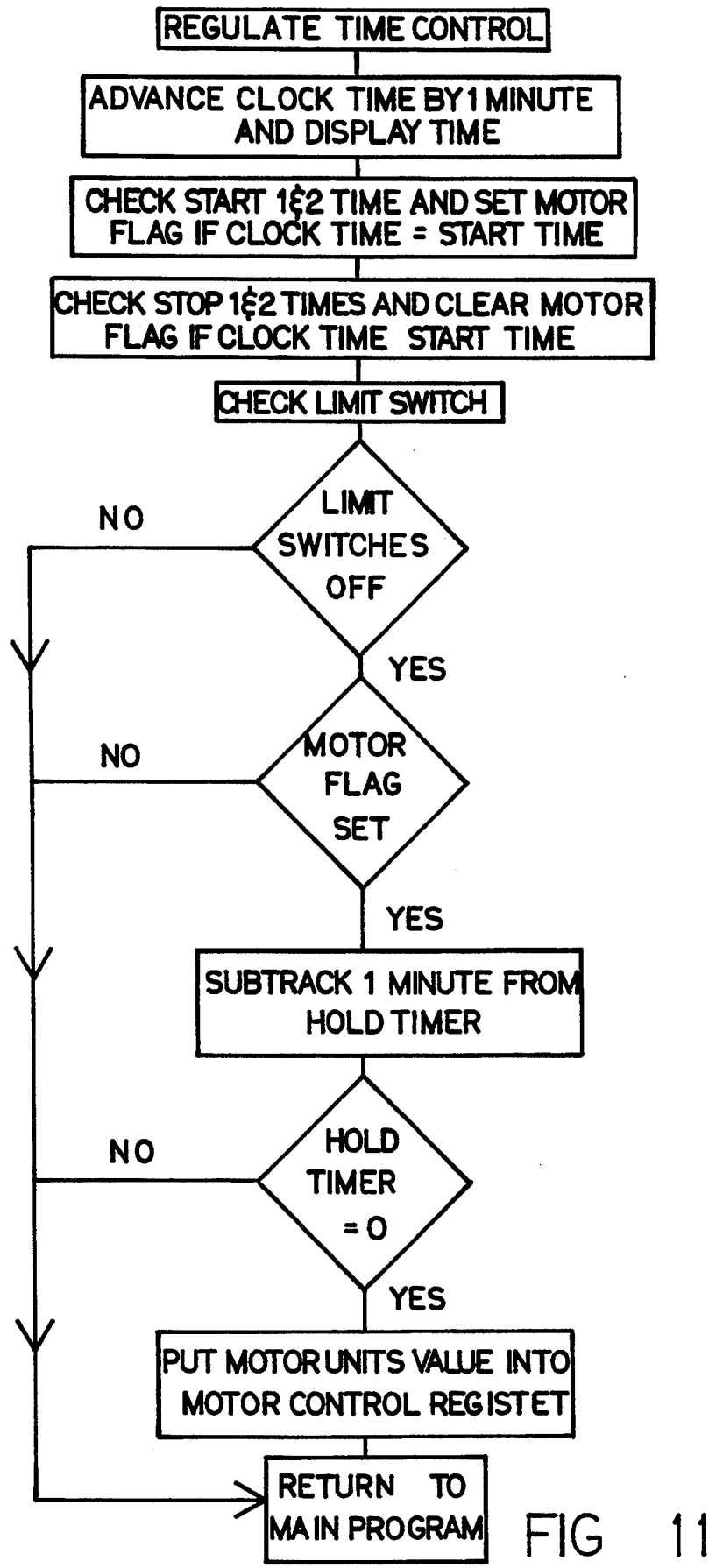
FIG. 11 is a flow diagram of the time regulation subprogram.
Figure 12:
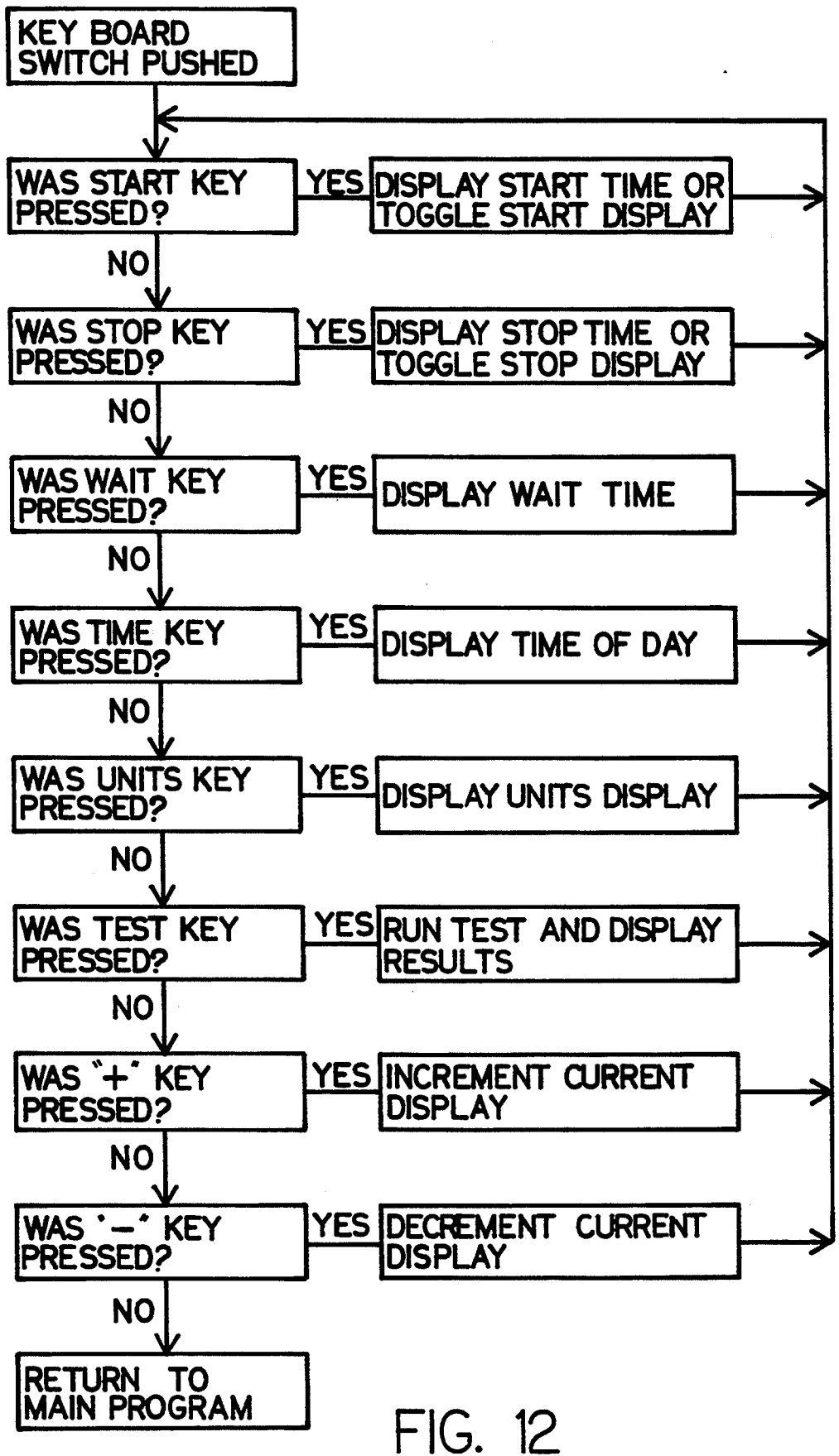
FIG. 12 is a flow diagram of the key board control subprogram.
Figure 13:
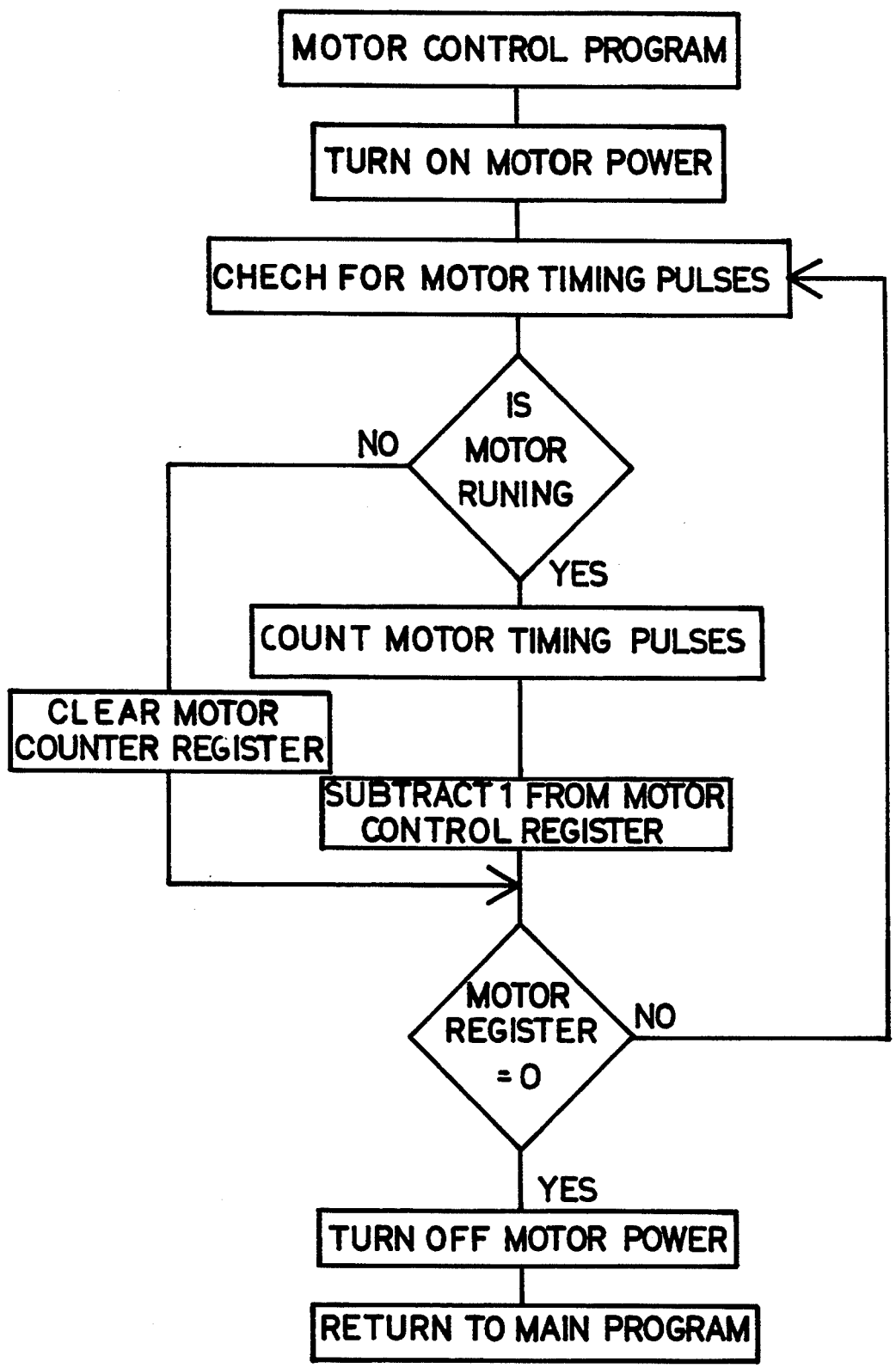
FIG. 13 is a flow diagram of the motor control subprogram.
Figure 24:
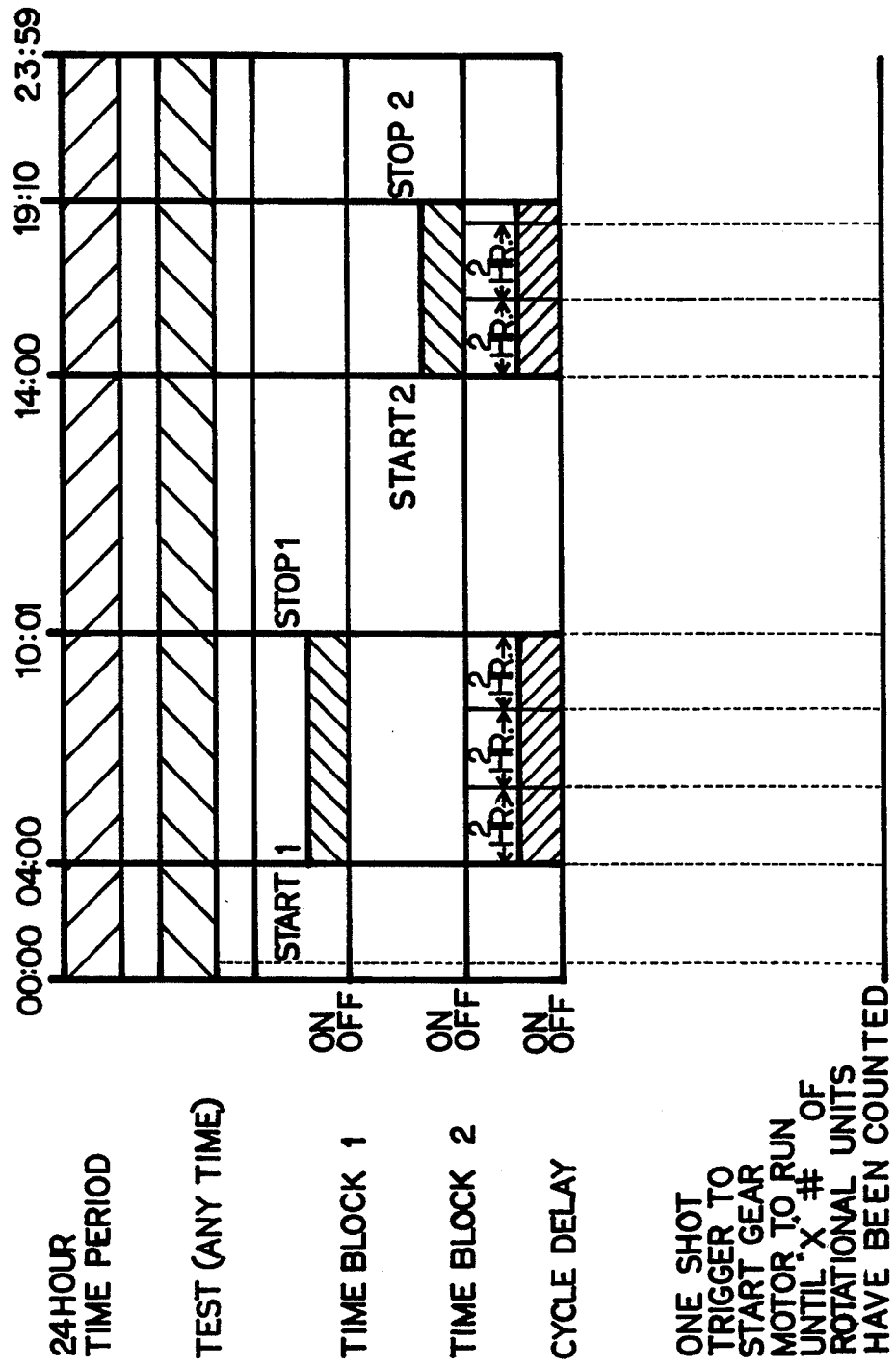
FIG. 24 is a diagram of a sample program.
Figure 25:
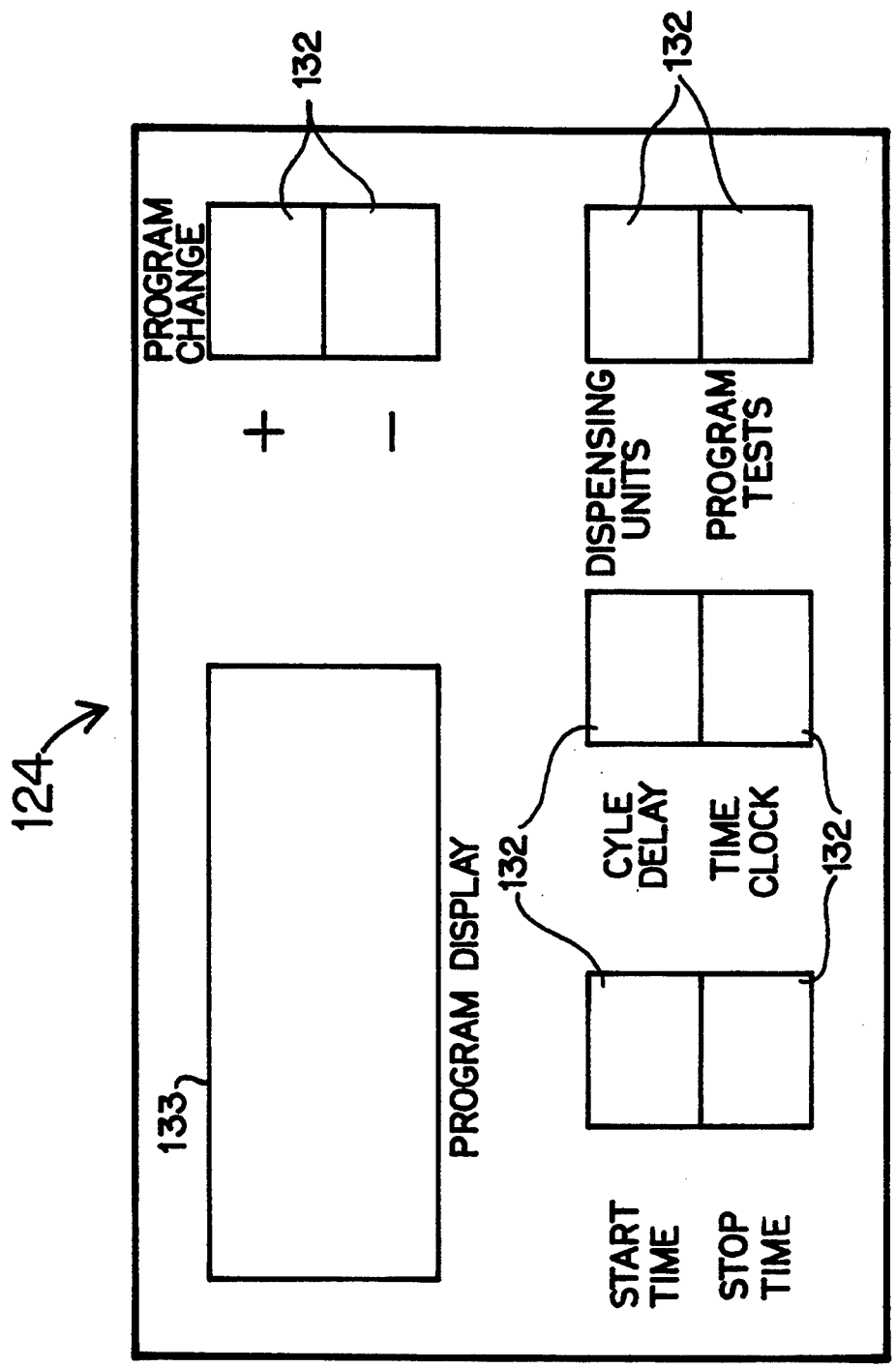
FIG. 25 is a detail view of the control panel.

The components of an operational control circuitry are shown in FIGS. 7, 8A,B & 9. The control logic that enables the hardware to operate is shown in FIGS. 10–13. An example of an actual program for the 27C16 memory device implementing this program logic is listed in source code in FIGS. 14–23. CMOS circuit technology is utilized for its ability to provide very low power consumption. This hardware is used in conjunction with a slow clock speed to reduce the total power consumption, thereby allowing long periods of operation on a battery powered supply, before replacement batteries are required.

The gear motor 115 and clutched gear assembly 113 and 114, drive geared spool assembly 112 to play out cable 108 in measured amounts determined by user programmed units. This is accomplished by the rotations of an idler gear located inside of the geared motor 115. A toroidal magnet 119 is fixed about this idler gear within gear motor 115, which drives drive shaft 114. A Hall effect transducer 118 is fixed to the casing of motor 115 in close proximity to toroidal magnet 119 to sense alternating magnetic fields when the magnet rotates. The output of Hall effect transducer 118 is electrically connected to control circuit 125. Each revolution of the idler gear corresponds to a fractional angular advance of the spool attached to geared spool assembly 112. Exactly how many degrees the spool rotates through for each half revolution of the idler gear depends upon the gear ratio established by gear motor 115, drive gear 113 and geared spool assembly 112. Control circuit 125 processes the information received from Hall effect transducer 118 to control the power supplied to gear motor 115 and thereby dispense a measured amount of liquid feed as described above. The actual quantity of liquid dispensed for a given number of rotations of the idler gear and particularly sized storage vessel is calibrated by direct measurement of liquid dispensed during a test cycle. From this information, tables can be generated to define the value of a unit of liquid feed. The operator then uses this information to program the desired quantity of liquid feed.

Other methods for sensing, monitoring and controlling the length of cable 108 are possible and include using optical or mechanical devices in place of Hall effect transducer 118. It Should also be apparent that there are many possible variations in the system programming, gear ratios, motor selection and transfer tube inlet elevation control. Design considerations include the cross-sectional area of the supply tank, the minimum measurable length of cable played out and the necessary resolution. Obviously, if it is desired to measure feed dispensed to the nearest ounce, much higher resolution is required and the system design would have to be altered accordingly, for example by decreasing the cross-sectional area of the tank to the point where each resolvable unit corresponded to one ounce.

Once the liquid feed is delivered into the feeding vessel 102 there are several means for an animal to consume liquid feed. For example, lick wheel 103 mounted through the top of feeding vessel 102 serves this purpose nicely. Lick wheels 103 extend down into the vessel to just above its bottom. The operator turns each wheel 103 through the liquid feed once to coat it with the liquid. The livestock will then continue to rotate these wheels by licking, which collects any liquid feed pooled in the feeding vessel by again coating the wheels as they turn through the liquid feed. Thus the liquid feed is delivered to the livestock. Lick balls or an open tray are alternative feed delivery devices which can be used dependent upon the size and class of livestock being fed. Each of these means can be implemented to actually deliver the liquid to the livestock as are well known in the industry.

In use, the operator raises the transfer tube to its uppermost elevation within the storage vessel by turning the transfer tube elevation control handle in a clockwise direction. The operator then fills the liquid feed storage vessel through the fill hole located on top of the storage vessel. Next, utilizing the elevation control handle, the operator lowers the transfer tube below the storage vessel's liquid level, allowing adequate time for enough liquid feed to flow through the transfer tube to wet the lick wheels, lick balls or feeding tray in the feeding vessel. As soon as this is accomplished, the operator raises the transfer tube to the point where the transfer tube inlet is resting just above the liquid level in the liquid feed storage vessel. Next, the operator must calculate the required quantity of liquid feed to be dispensed per feeder unit utilizing the method illustrated on the following worksheet and in the programming examples. After calculating the required quantity of liquid feed being dispensed, the program parameters are input utilizing the following programming definitions and input guideline.

PROGRAMMING DEFINITIONS AND INPUT GUIDELINE

LIQUID FEED DISPENSING CYCLE—The dispensing cycle is initiated when the controller activates the motor on the cable release assembly thereby lowering the transfer tube in the storage vessel and allowing feed to flow into the liquid feeding vessel. The start time of each feeding time block will always be the time when the first dispensing cycle is initiated.

TIME CLOCK—The current Time will normally be displayed in the LCD display screen, e.g. 12:10, with the time increasing by one minute every 60 seconds.

SET TIME—This is the way you enter the current time of day. This is accomplished by depressing the time clock touch pad square at the same time as either the + or − touch pad entry square.

TIME SYSTEM—Military time (1-24 hours)

TIME DISPLAY—Time will be continuously displayed in the LCD display screen (i.e.) 12:10 until any function touch pad square is depressed, e.g. "START TIME." At the moment that a touch pad function square is depressed the LCD display screen will show the specific function being viewed and the current set numeric value of this function. The display is automatically programmed to return to the current time, e.g. 12:11 at the time when the display would normally advance to the next minute.

FEEDING TIME BLOCK—This represents the user defined time block which is established by the start and stop program input. The controller allows up to two such defined time blocks and can be defined as the time which begins with Start #1 or Start #2 and ends with Stop #1 or Stop #2. The assigned start and stop times must fall within one 24 hour period.

START TIME—Start time is used to set the time for the beginning of each feeding time block. Start #1 is always the first time block to run therefore, if two run periods are selected Start #2 must follow Stop #1. The current start time entered into the controller can be viewed on the LCD display screen while depressing the start touch pad square. Either Start #1 or Start #2 may appear upon depressing the start touch pad square. If the opposite start time is desired for either viewing or input then this can be accomplished by alternately releasing and depressing the touch pad square. To change the programmed start display the touch pad entry square for either Start #1 or Start #2 must be depressed at the same time as either the + or − touch pad entry square.

STOP TIME—Stop time is used to set the time for the ending of each feeding time block. Stop #1 is always the first time block to run therefore, if two run periods are selected Stop #2 must follow Stop #1. The current stop time entered into the controller can be viewed on the LCD display screen while depressing the stop touch pad square. Either Stop #1 or Stop #2 may appear upon depressing the stop touch pad square. If the opposite stop time is desired for either viewing or input then this can be accomplished by alternately releasing and depressing the touch pad square. To change the programmed stop display the touch pad entry square for either Stop #1 or Stop #2 must be depressed at the same time as either the + or − touch pad entry square.

CYCLE DELAY TIME—The period of time which elapses between each dispensing cycle within each feeding time block. The cycle delay time must be the same for both feeding time blocks if both time blocks are used. The minimum cycle delay time is 1 minute and the maximum cycle delay period is 90 minutes or (01:30) as it is displayed. The current cycle delay time entered into the controller can be viewed on the LCD display screen while depressing the cycle delay touch pad square. To change the programmed cycle delay time the touch pad entry square for cycle delay time must be depressed at the same time as either the + or − touch pad entry squares.

DISPENSING UNITS—This is a number the operator must enter which is determined by first calculating the desired liquid feed output per feeder per day then dividing this amount by the total desired cycles per day and then referencing this number against the programmed guide located on the inside cover of the control unit. This number represents the number of dispensing units to enter into the controller. The current units entered into the controller can be viewed on the LCD display screen while depressing the dispensing units square. To change the programmed units display the touch pad entry square for units must be depressed at the same time as either the "+" or "−" touch pad entry square.

PROGRAM TEST—By Momentarily depressing the touch pad square TEST, the gear motor will begin running, provided previous program entries have been entered. The gear motor will run until the number of units counted matches the number that is currently in the UNITS variable. If no number has been entered, i.e. UNITS equals zero, the motor can not run. Provided there is a value greater than zero, running of the gear motor will occur whenever the TEST touch pad square is pressed, regardless of the current time or at what place the controller is in the running of the entered program values.

To Figure Units: Refer to programming examples using the following formulas:

____Head × ____lbs/hd/day = ____lbs/day

____lbs/day ÷ .33 lbs/unit = ____Total units/day

Stop #1 ____ − Start #1 ____ + ____hrs. and ____min. = total minutes.

Total min. ____ ÷ Cycle delay in minutes ____ + 1 = ____# of cycles.

Stop #2 ____ − Start #2 ____ = ____hrs. and ____min. = ____total minutes.

Total min. ____ ÷ Cycle delay in minutes ____ + 1 = ____# of cycles.

# of Cycles Time #1 ____ + # Cycles Time #2 ____ = total # cycles/day. Drop any numbers less than a full cycle e.g., 1.5 = 1 cycle.

____Total units/day ÷ ____Total cycles/day = ____units/cycle.

PROGRAMMING EXAMPLE #1

Assume 50 head (hd) of livestock which are to consume 2 lbs. per head per day, start time at 7:00 A.M., stop at

| | |
|---|---|
| 1. | Make sure time is correct |
| 2. | Set Start #1 at 07:00 |
| 3. | Set Stop #1 at 21:01 |
| 4. | Set cycle delay at 01:00 |
| 5. | Figure Units: |
| | 50 hd × 2 lbs/hd/day = 100 lbs/day. |
| | 100 lbs/day ÷ .33 lbs/unit = 303 units/day. |
| | 21:01 hrs − 7:00 hrs = 14.01 hrs + 1 hr for 1st cycle. |
| | 15:01 hrs/day ÷ 1 hr/cycle = 15 cycles/day. |
| | 303 units/day ÷ 15 cycles/day = 20.2 units/cycle. |
| 6. | Set units at 00:20. |

PROGRAMMING EXAMPLE #2

Assume 75 head (hd) of livestock which are to consume 1.75 lbs/day. The feed is to be dispensed between 6:00 a.m. and 11:15 a.m. and between 4:30 p.m. and 9:45 p.m. The controller is to cycle and dispense supplement every 45 minutes.

| | |
|---|---|
| 1. | Make sure time is correct. |
| 2. | Set Start #1 at 06:00. |
| 3. | Set Start #2 at 16:30. |
| 4. | Set Stop #1 at 11:16. |
| 5. | Set Stop #2 at 21:46. |
| 6. | Set cycle delay at 00:45. |
| 7. | Figure Units: |
| | 75 hd × 1.75 lbs/hd/day = 131.25 lbs/day. |
| | 131.25 lbs/day ÷ .33 lbs/unit = 398 units/day. |
| | Time Period #1: 11:16 − 6:00 = 5 hrs 16 min. or 316 min. |
| | 316 min. ÷ 45 min./cycle = 7 cycles + 1 for 1st cycle = 8 cycles Time Period #1 |
| | Time Period #2: 21:46 − 16:30 = 5 hrs 16 min. or 316 min. |
| | 316 min. ÷ 45 min./cycle = 7 cycles + 1 for 1st cycle = 8 cycles (16 total) |
| | Therefore, 398 units/day ÷ 16 cycles/day = 24.87 or 25. |

While the foregoing material describes the present preferred embodiment of the invention, it is to be distinctly understood that this invention is not limited thereto but may be variously embodied to practice within the scope of the following claims.

We claim:

1. A liquid feed dispensing device for livestock which comprises:
   a supply vessel;
   a feeding vessel being attached to the supply vessel and configured to receive a flow of liquid from the supply vessel;
   a transfer tube, being located within the supply vessel, having an inlet end which is freely movable to any elevation within the supply vessel and a second end in fluid communication with the feeding vessel;
   programmable inlet elevation control means for discretely and incrementally controlling the elevation of the inlet end of the transfer tube to permit a predetermined volume of fluid, which is the volume located at an elevation above the inlet end, in the supply vessel, to flow through the transfer tube into the feeding vessel;
   means for delivering any liquid in the feeding vessel to the livestock;
   timer means for accruing elapsed time and dispensing liquid into the feeding vessel at predetermined times during the day; and
   liquid level sensor means for sensing a high liquid level in the feeding vessel.

2. The livestock feeder of claim 1 wherein the liquid level sensor comprises a pair of conductive probes located on an upper inside surface of the feeding vessel and positioned in spaced apart relation one to the other.

3. The livestock feeder of claim 2 wherein the liquid level sensor further comprises an inverted cup being axially attached about the longer probe.

4. The livestock feeder of claim 1 wherein the inlet elevation control means comprises:
   a microprocessor based electronic control circuit;
   a power supply electrically connected to the control circuit;
   an electric motor being electrically connected to the power supply through a switching means, which is electrically connected to the control circuit to selectively supply power to the electric motor in response to the control circuit;
   a spool being driven by the motor;
   a cable having one end attached to the spool, the cable being wound around the spool, and a second end attached to the inlet end of the transfer tube to selectively raise and lower the inlet end in response to the control circuit;
   means for counting the number of degrees of rotation of the spool to monitor and determine the elevation of the inlet end of the transfer tube; and
   manual adjustment means for manually rotating the spool to adjust the elevation of the inlet end of the transfer tube.

5. The livestock feeder of claim 4 wherein the means for counting the number of degrees of rotation comprises a Hall effect transducer magnetically coupled with a magnet, the magnet being affixed to a rotating member, wherein the rotating member rotates proportionately with the spool.

6. A liquid feed dispensing device for livestock which comprises:
   a supply vessel;

a feeding vessel being attached to the supply vessel and configured to receive a flow of liquid from the supply vessel;

a transfer tube, being located within the supply vessel, having an inlet end which is freely movable to any elevation within the supply vessel and a second end in fluid communication with the feeding vessel;

timer means for accruing elapsed time and dispensing liquid into the feeding vessel at predetermined times during the day;

liquid level sensor means for sensing a high liquid level in the feeding vessel; and means for delivering any liquid in the feeding vessel to the livestock.

7. The livestock feeder of claim 6 wherein the liquid level sensor comprises a pair of conductive probes located on an upper inside surface of the feeding vessel and positioned in spaced apart relation one to the other.

8. The livestock feeder of claim 7 wherein the liquid level sensor further comprises an inverted cup being axially attached about the longer probe.

* * * * *